United States Patent [19]
Ide et al.

[11] Patent Number: 6,167,335
[45] Date of Patent: Dec. 26, 2000

[54] VEHICULAR OCCUPANT PROTECTION SYSTEM AND CRASH MODE DETERMINING UNIT THEREOF

[75] Inventors: Seiya Ide, Okazaki; Tomoji Suzuki, Nagoya; Yoshihiko Teguri, Okazaki, all of Japan

[73] Assignee: Denso Corporation, Kariya, Japan

[21] Appl. No.: 09/176,959

[22] Filed: Oct. 22, 1998

[30] Foreign Application Priority Data

Oct. 23, 1997 [JP] Japan ..................................... 9-291319
Aug. 7, 1998 [JP] Japan ................................. 10-224449

[51] Int. Cl.[7] .................................................. G09G 17/00
[52] U.S. Cl. ................................ 701/45; 701/46; 180/271
[58] Field of Search .................................. 701/45, 46, 47; 280/735; 180/271; 307/10.1; 340/436, 438

[56] References Cited

U.S. PATENT DOCUMENTS

| 4,166,641 | 9/1979 | Okada et al. ............................. 280/735 |
| 5,189,311 | 2/1993 | Moriyama et al. ...................... 307/10.1 |
| 5,202,831 | 4/1993 | Blackburn et al. ........................ 701/46 |
| 5,777,225 | 7/1998 | Sada et al. ................................. 73/488 |
| 5,995,892 | 11/1999 | Kiribayashi et al. ..................... 701/45 |

FOREIGN PATENT DOCUMENTS

| 823356 | 2/1998 | European Pat. Off. . |
| 4-244454 | 9/1992 | Japan . |
| 8-62239 | 3/1996 | Japan . |

*Primary Examiner*—William A. Cuchlinski, Jr.
*Assistant Examiner*—Marthe Y. Marc-Coleman
*Attorney, Agent, or Firm*—Pillsbury Madison & Sutro LLP

[57] ABSTRACT

A crash mode determining unit comprises first and second acceleration sensors disposed on both sides of a vehicle and a third acceleration sensor disposed almost at a center of the vehicle. A relative line integration length of one of the integrated outputs of the accelerations detected by the first and second acceleration sensors with respect to the integrated output of the acceleration detected by the third acceleration sensor is calculated. The relative line integration length of the integrated output becomes long when a crash mode is either a pole crash or a under-ride crash. Therefore, the crash mode of the pole crash or the under-ride crash can be determined by comparing the relative line integration length with a predetermined length.

19 Claims, 11 Drawing Sheets

VEHICULAR OCCUPANT PROTECTION SYSTEM AND CRASH MODE DETERMINING UNIT THEREOF

CROSS REFERENCE TO RELATED APPLICATION

This application is based upon and claims the benefit of priority of Japanese Patent Applications No. 9-291319 filed on Oct. 23, 1997, and No.10-224449 filed on Aug. 7, 1998, the contents of which are incorporated by reference.

BACKGROUND OF THE INVENTION

1. Field of the Invention

The present invention relates to a vehicular occupant protection system such as an air bag system and a pretensioner for a seat belt provided in a vehicle and a crash mode determining unit and a crash mode determining method therefor.

2. Discussion

An acceleration sensor 1 of a vehicular air bag system is disposed for example in the vicinity of a console box on the floor of the cabin of a car as shown in FIG. 11 to detect acceleration of the vehicle. The system determines whether or not a crash has occurred by comparing the detected acceleration with a single threshold value. When the system determines that a crash has occurred, it spreads an air bag by turning on an activation unit to protect an occupant of the car from the impact of the crash.

However, because the above-mentioned air bag system merely determines whether or not the crash has occurred by comparing the detected acceleration with the single threshold value, it is unable to discriminate even to a mode of the crash.

For instance, it is unable to discriminate a head-on crash against a car running in the opposite direction while running at low speed from a crash against a pole while running at intermediate speed. As a result, it has had a problem that its determination timing is late in a case of the crash against the pole.

Examining the cause of the above-mentioned problem in detail, it was found that an integrated value of the detected acceleration (hereinafter referred to as a velocity change) changes as time elapses as shown by a curve L1 in FIG. 12 in a case of the head-on crash. Meanwhile, the velocity change changes as time elapses as shown by a curve L2 in FIG. 12 in a case of the pole crash.

Therefore, when it is determined whether or not the crash has occurred using the single threshold value in the respective cases of the head-on crash and the pole crash, the determination timing of the pole crash is late as compared to the determination timing of the head-on crash as it is apparent by comparing the states of changes of the both curves L1 and L2. As a result, when the car crashes against the pole, the timing for spreading the air bag is delayed and the occupant cannot be protected appropriately.

The inventors have studied the correlation among the respective accelerations which are generated at a plurality of points of the car when the car crashes and the relationship between the correlation and crash modes of the vehicle.

The crash modes of the car (hereinafter referred to as a car A) include, mainly, a head-on crash, an oblique crash, an offset crash, an under-ride crash and a pole crash (see FIG. 10).

The head-on crash is a crash mode wherein the car A crashes against the front part of a vehicle W running in the opposite direction by the whole front end part thereof. In the head-on crash, the both front right and left frames of a frame Aa at the front end part of the car A crash against the front part of the vehicle W running in the opposite direction. It is noted that the frame Aa is normally formed of a highly rigid metallic material.

The offset crash is a crash mode wherein the car A crashes against the front right side of the vehicle W running in the opposite direction by the front right side thereof, for example. In the offset crash, the frame Aa of the car A crashes against the front right side of the vehicle W running in the opposite direction by only the right frame among the both front right and left frames.

The pole crash is a crash mode wherein the car A crashes against a pole P by the front center part thereof. In the pole crash, the pole P cuts into a part between the front right and left frames of the frame Aa. It is noted that the rigidity of the part between the front right and left frames among the frame Aa is very low as compared to that of the frame Aa.

It was found that respective components such as an engine located between the front right and left frames of the frame Aa hit to each other and show complicated behavior during the process of the pole crash when their behavior are studied.

The under-ride crash is a crash mode wherein the car A enters under the rear lower part of a preceding vehicle W by the front end part thereof as shown in FIG. 10.

The oblique crash is a crash mode wherein the car A crashes against the front part of the vehicle W running in the opposite direction obliquely by the front end part thereof.

Three acceleration sensors were used to study accelerations at a plurality of points of the car. One acceleration sensor (hereinafter referred to as an acceleration sensor X) was disposed at the center both in the longitudinal and in the right and left directions of the car A and the two remaining acceleration sensors (hereinafter referred to as acceleration sensors Y) were disposed at the positions closer to the front part than the acceleration sensor X on the both right and left sides of the car A.

The following result was obtained by studying the correlation among the integrated values of the detected accelerations, i.e., the velocity changes, of the above-mentioned respective acceleration sensors when the car A crashes.

That is, when the crash mode of the car A is the head-on crash, the velocity changes, i.e., the integrated values of the respective detected accelerations, of the two acceleration sensors Y are almost the same. Further, the respective velocity changes are greater than the velocity change of the acceleration sensor X when the head-on crash has occurred.

When the crash mode of the car A is either the offset crash or the oblique crash, for example, when the car A has caused the offset crash or the oblique crash by the right side thereof, the velocity change of the acceleration detected by the right acceleration sensor among the two acceleration sensors Y is greater than the velocity change of the acceleration detected by the left acceleration sensor. Still more, the velocity change of the acceleration detected by the left acceleration sensor is almost equal with the velocity change of the acceleration detected by the acceleration sensor X.

When the crash mode of the car A is either the pole crash or the under-ride crash, the velocity changes of the respective accelerations detected by the two acceleration sensors Y both change in complex while taking values close to the velocity change of the acceleration detected by the acceleration sensor X. It is considered to be caused by the complex behavior of the components such as the engine as described above when the crash mode is either the pole crash or the under-ride crash.

SUMMARY OF THE INVENTION

Accordingly, it is an object of the present invention to provide a vehicular occupant protection system as well as a crash mode determining unit and a crash mode determining method therefor which are able to determine a crash mode adequately by utilizing the correlation among the respective outputs detected by a plurality of acceleration sensors for detecting accelerations generated at a plurality of points in a vehicle when a crash occurs.

A crash mode determining unit of the inventive vehicular occupant protection system comprises first and second acceleration sensors disposed on both sides of a vehicle in a lateral direction thereof so as to detect both accelerations generated at the both sides of the vehicle when the vehicle crashes; a third acceleration sensor disposed almost at a center both in a longitudinal and lateral directions of the vehicle to detect acceleration generated almost at the center of the vehicle; first and second integrating devices for respectively integrating the accelerations detected by the first and second acceleration sensors to generate as integrated outputs; a third integrating device for integrating the acceleration detected by the third acceleration sensor to generate as an integrated output; a relative line integration length calculating device for calculating a relative line integration length of one of the both integrated outputs of the first and second integrating devices with respect to the integrated output of the third integrating device; a phase difference calculating device for calculating a phase difference between the both integrated outputs of the first and second integrating device; and a crash mode determining device for determining that a crash mode is either an offset crash or an oblique crash when a phase difference calculated by the phase difference calculating device is greater than a predetermined phase value, for determining that a crash mode is a head-on crash when the phase difference is smaller than the predetermined phase value and when the relative line integration length calculated by the relative line integration length calculating device is smaller than a predetermined length value and for determining that a crash mode is either a pole crash or an under-ride crash when the phase difference is smaller than the predetermined phase value and when the relative line integration length is greater than the predetermined length value.

The mode of the crash can be thus determined based on the phase difference between the integrated outputs of the first and second integrating devices and the size of the relative line integration length. That is, it is possible to discriminate the pole crash and the under-ride crash correctly from the other crash modes and to determine the occurrence of the pole crash or the under-ride crash timely. As a result, it becomes possible to protect the occupant adequately in correspondence to the pole crash or the under-ride crash.

The specific nature of the invention, as well as other objects, uses and advantages thereof, will clearly appear from the following description and from the accompanying drawings in which like numerals refer to like parts.

DESCRIPTION OF PREFERRED EMBODIMENTS (First Embodiment)

A first embodiment of the present invention will be described below with reference to the drawings.

Figure 1:
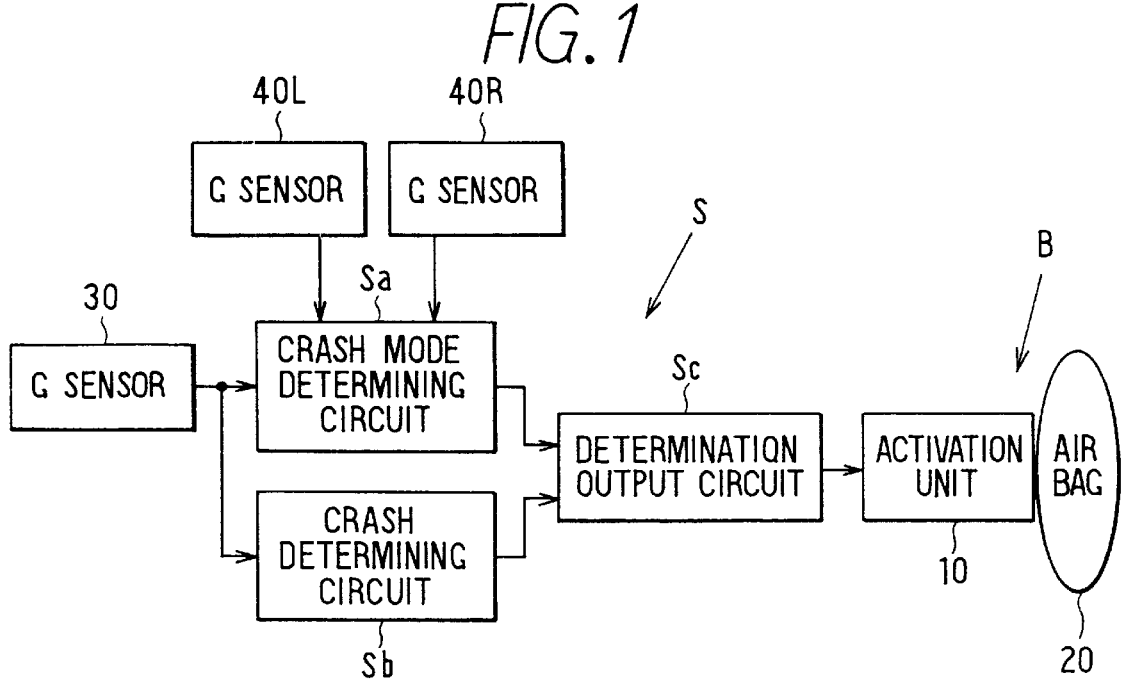
FIG. 1 is a block diagram showing the structure of a first embodiment of the present invention.

FIG. 1 shows a first embodiment of the present invention applied to a vehicular air bag system. The air bag system is composed of an air bag unit B and a determining unit S.

The air bag unit B is composed of an activation unit 10 and a driver air bag 20 spread by the activation unit 10. The air bag 20 protects the occupant on the driver's seat of a car from an impact caused by a car crash against an obstruction. The determining unit S is equipped with a center acceleration sensor 30 and right and left acceleration sensors 40R and 40L. It is noted that these acceleration sensors will be referred to as G sensors hereinafter.

Figure 2:
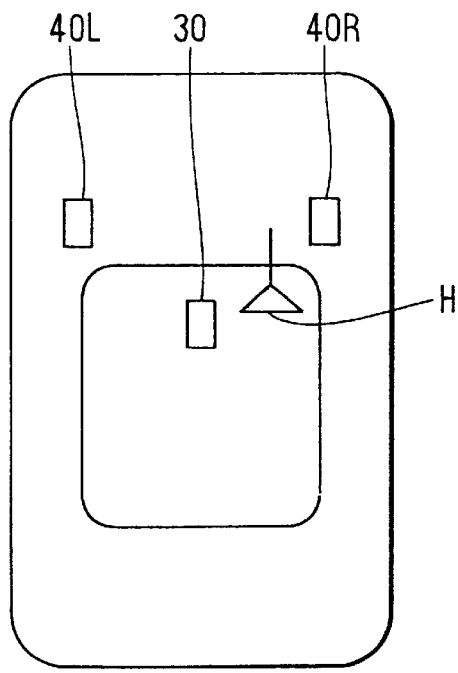
FIG. 2 is a plan view showing the positions where respective G sensors shown in FIG. 1 are installed within a car.

The center G sensor 30 is fixed on the floor of a cabin so as to be positioned almost at the center in the both longitudinal and lateral directions of the car as shown in FIG. 2. The center G sensor 30 detects acceleration caused at that fixed position when the car crashes against the obstruction and generates an acceleration signal. It is noted that the center G sensor 30 may be fixed at the lower part of a console box for example on the floor of the cabin. The center G sensor 30 is fixed at the above-mentioned position selectively in order to detect mainly low frequency components among frequency components of the acceleration caused by the car crash.

The right and left G sensors 40R and 40L are fixed respectively at the positions closer to the front side than the center G sensor 30 and at the back lower parts of right and left dash panels within the cabin. It is noted that the respective dash panels are formed of a highly rigid metal plate.

The right and left G sensors 40R and 40L detect accelerations caused at the fixed positions when the car crashes against the obstruction, respectively. It is noted that the positions where the right and left G sensors 40R and 40L are fixed are not limited to the right and left dash panels. They may be fixed at highly rigid parts at the right and left sides of the center G sensor 30.

The right and left G sensors 40R and 40L are fixed at the above-mentioned positions selectively in order to detect mainly high frequency components among the frequency components of the accelerations caused by the car crash. It is noted a symbol H in FIG. 2 denotes a steering wheel of the car.

The determining unit S further comprises a crash mode determining circuit Sa connected with the center G sensor 30 and the right and left G sensors 40R and 40L, a crash determining circuit Sb connected with the center G sensor 30 and a determination output circuit Sc connected with the crash mode determining circuit Sa and the crash determining circuit Sb.

Figure 3:
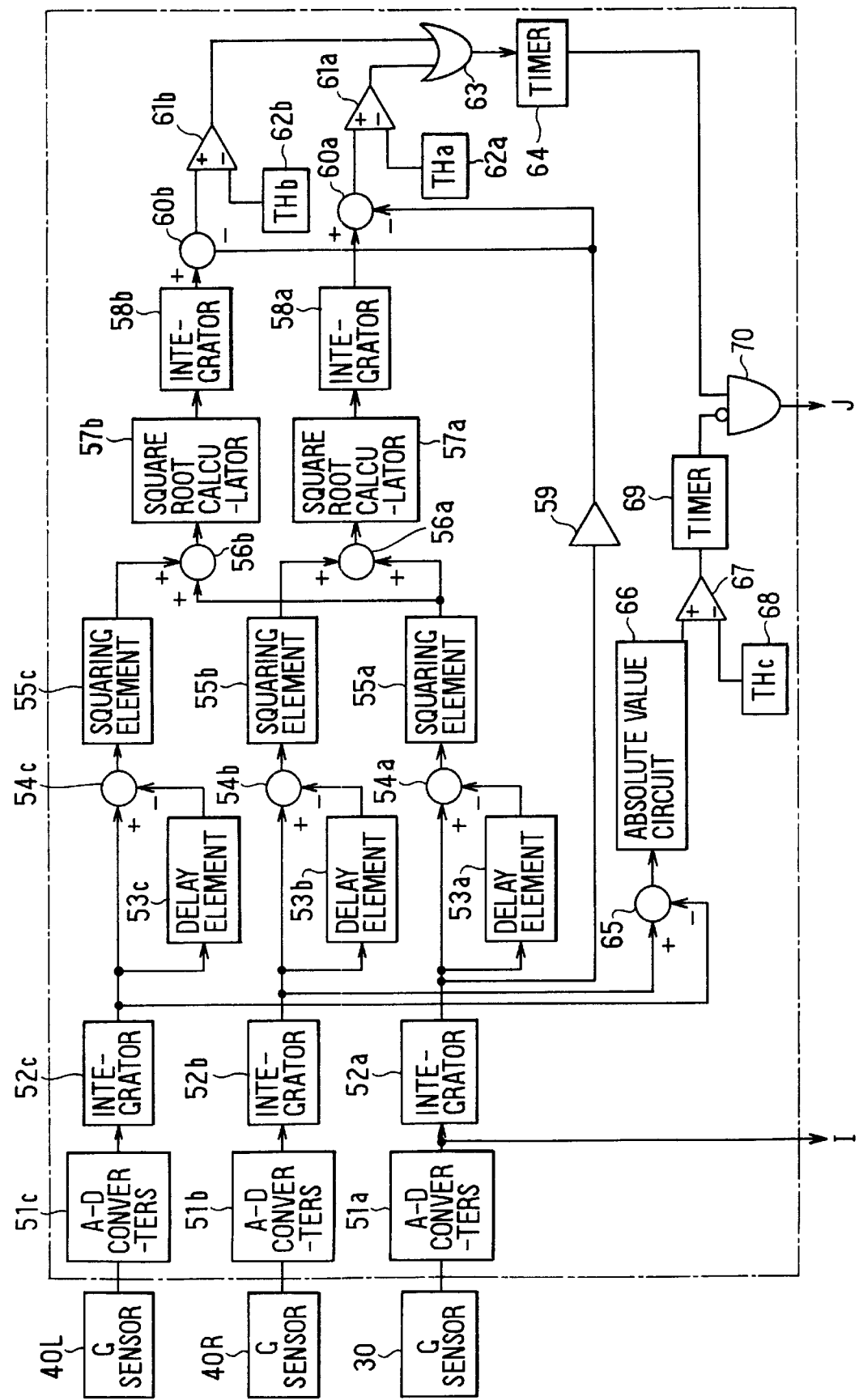
FIG. 3 is a detailed circuit diagram of a crash mode determining circuit in the block diagram in FIG. 1.

The crash mode determining circuit Sa comprises three A-D converters 51*a* through 51*c* as shown in FIG. 3. The A-D converter 51*a* digitizes the acceleration detected by the center G sensor 30 and outputs it to an integrator 52*a*. The A-D converters 51*b* and 51*c* digitize the accelerations detected by the right and left G sensors 40R and 40L and output them to integrators 52*b* and 52*c*, respectively.

The integrators 52*a* through 52*c* integrate the accelerations outputted by the A-D converters 51*a* through 51*c*, respectively. Delay elements 53*a* through 53*c* delay the integrated outputs of the integrators 52*a* through 52*c*, respectively.

Subtracters 54*a* through 54*c* subtract the delayed outputs of the delay circuits 53*a* through 53*c* from the integrated outputs of the integrators 52*a* through 52*c*, respectively. Squaring elements 55*a* through 55*c* square the subtracted outputs of the subtracters 54*a* through 54*c*, respectively.

An adder 56*a* adds the square outputs of the squaring elements 55*a* and 55*b* and an adder 56*b* adds the square outputs of the squaring elements 55*a* and 55*c*. Square root calculators 57*a* and 57*b* calculate square roots of the added outputs from the adders 56*a* and 56*b*, respectively. Integrators 58*a* and 58*b* line-integrate the square root outputs of the square root calculators 57*a* and 57*b*, respectively.

A constant multiplier 59 multiplies a square root of a constant "2" with the integrated output of the integrator 52*a*. It is noted that the constant "2" may be changed appropriately. Subtracters 60*a* and 60*b* subtract the multiplied output of the constant multiplier 59 from the line-integrated outputs of the integrators 58*a* and 58*b*, respectively.

A comparator 61*a* compares the subtracted output of the subtracter 60*a* with a preset threshold value THa of a threshold setting element 62*a*. Then, the comparator 61*a* outputs a high-level comparison output when the subtracted output of the subtracter 60*a* is greater than the preset threshold value THa. When the subtracted output of the subtracter 60*a* is smaller than the preset threshold value THa, the comparison output of the comparator 61*a* turns to low level.

When the comparison output of the comparator 61*a* is at high level, it means that the length of the line integration of the integrator 58*a* is relatively long. That is, it corresponds to the cases of the pole crash and the under-ride crash during which the acceleration detected by the right G sensor 40R changes in complex. When the comparison output of the comparator 61*a* is at low level, it means that the length of the line integration of the integrator 58*a* is relatively short. It corresponds to the cases of the head-on crash and the offset crash during which changes of the acceleration detected by the right G sensor 40R are simple.

A comparator 61*b* compares the subtracted output of the subtracter 60*b* with a preset threshold value THb (=THa) of a threshold setting element 62*b*. Then, the comparator 61*b* outputs a high-level comparison output when the subtracted output of the subtracter 60*b* is greater than the preset threshold value THb. When the subtracted output of the subtracter 60*b* is smaller than the preset threshold value THb, the comparison output of the comparator 61*b* turns to low level.

Similarly to what has been described above, the mode of the car crash may be determined to be the pole crash or the under-ride crash when the comparison output of the comparator 61*b* is at high level and the mode of the car crash may be determined to be the head-on crash, the offset crash or the oblique crash when the comparison output of the comparator 61*b* is at low level.

An OR gate 63 calculates a logical sum of the respective comparison results of the comparators 61*a* and 61*b*. A timer 64 starts to count time based on a high level logical sum signal outputted by the OR gate 63 and keeps a high-level timer output during a period of time which is necessary for determining whether or not it is necessary to spread the air bag 20.

A subtracter 65 subtracts the integrated output of the integrator 52*c* from the integrated output of the integrator 52*b*. An absolute value circuit 66 calculates an absolute value of the subtracted output of the subtracter 65.

A comparator 67 compares the absolute value outputted by the absolute value circuit 66 with a preset threshold value THc of a threshold setting element 68. Then, the comparator 67 outputs a high-level comparison output when the absolute value output of the absolute value circuit 66 is greater than the preset threshold value THc. When the absolute value output of the absolute value circuit 66 is smaller than the preset threshold value THc, the comparison output of the comparator 67 turns to low level.

The preset threshold value THc is defined in such a manner that when the comparison output of the comparator 67 is at high level, it corresponds to the case when the mode of the car crash is the oblique crash or the offset crash, and when the comparison output of the comparator 67 is at low level, it corresponds to the case when the mode of the car crash is the head-on crash, the pole crash or the under-ride crash. A timer 69 starts to count time based on the high-level comparison output of the comparator 67 and keeps the high-level timer output during a period of time which is necessary for determining whether or not it is necessary to spread the air bag 20.

An AND gate 70 calculates a logical product of the timer output of the timer 64 and an inverted input of the timer output of the timer 69. The output of the AND gate 70 turns to high level when the timer output of the timer 64 is at high level and the timer output of the timer 69 is at low level. It means that the mode of the car crash is either the pole crash or the under-ride crash. It is noted that when the output of the AND gate 70 is at low level, it corresponds to the crash mode other than the pole crash and the under-ride crash.

Figure 4:
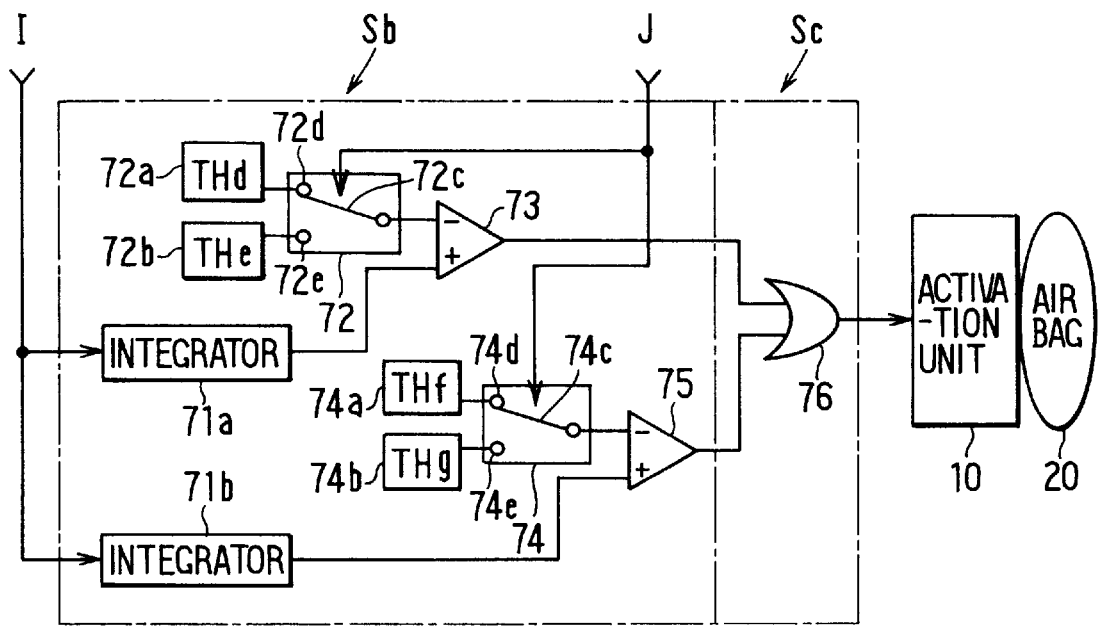
FIG. 4 is a detailed circuit diagram of a crash determining circuit and a determination output circuit of the block diagram in FIG. 1.

The crash determining circuit Sb comprises integrators 71*a* and 71*b* as shown in FIG. 4. These integrators 71*a* and 71*b* interval-integrate the digital output of the A-D converter 51*a*.

The crash determining circuit Sb also comprises threshold setting elements 72a and 72b and a change-over switch 72. The threshold setting element 72a sets a threshold value THd to determine the occurrence of the head-on crash, the offset crash or the oblique crash of the car. Meanwhile, the threshold setting element 72b sets a threshold value THe to determine the occurrence of the pole crash or the under-ride crash of the car. The threshold value THe is set at a value smaller than the threshold value THd so that the air bag 20 is spread at earlier timing in a case of the pole crash or the under-ride crash as compared to the cases of the other crash modes.

The change-over switch 72 is changed over to first or second state based on the logical product output of the AND gate 70. In detail, the change-over switch 72 is changed to the first state when the logical product output is at low level and is changed to the second state when the logical product output is at high level. In the first state, the preset threshold value THd of the threshold setting element 72a is outputted to a minus side input terminal of a comparator 73 and in the second state, the preset threshold value THe of the threshold setting element 72b is outputted to the minus side input terminal of the comparator 73.

It is noted that the first state of the change-over switch 72 corresponds to the state in which a change-over contact 72c of the change-over switch 72 is put to a fixed contact 72d and the second state of the change-over switch 72 corresponds to the state in which the change-over contact 72c of the change-over switch 72 is put to a fixed contact 72e.

The comparator 73 compares the integrated output of the integrator 71a with the preset threshold value given through the change-over switch 72. Then, the comparator 73 outputs a high-level comparison output when the integrated output of the integrator 71a is greater than the preset threshold value from the change-over switch 72. The comparison output of the comparator 73 is at low level when the integrated output of the integrator 71a is smaller than the preset threshold value from the change-over switch 72.

The crash determining circuit Sb further comprises threshold setting elements 74a and 74b, a change-over switch 74 and a comparator 75. The threshold setting element 74a sets a threshold value THf to determine the occurrence of the head-on crash, the offset crash or the oblique crash of the car. Meanwhile, the threshold setting element 74b sets a threshold value THg to determine the occurrence of the pole crash or the under-ride crash of the car. The threshold value THg is set at a value smaller than the threshold value THf so that the air bag 20 is spread at earlier timing in a case of the pole crash or the under-ride crash as compared to cases of the other crash modes. The other functions of the change-over switch 74 and the comparator 75 are the same with those of the above-mentioned change-over switch 72 and the comparator 73.

The determination output circuit Sc is composed of an OR gate 76 which calculates a logical sum of the comparison outputs of the both comparators 73 and 75 and outputs it to the activation unit 10.

In the first embodiment constructed as described above, when the car crashes against an obstruction located ahead thereof, the center G sensor 30 and the right and left G sensors 40R and 40L detect accelerations caused at their respective fixed positions of the car.

Figure 5:
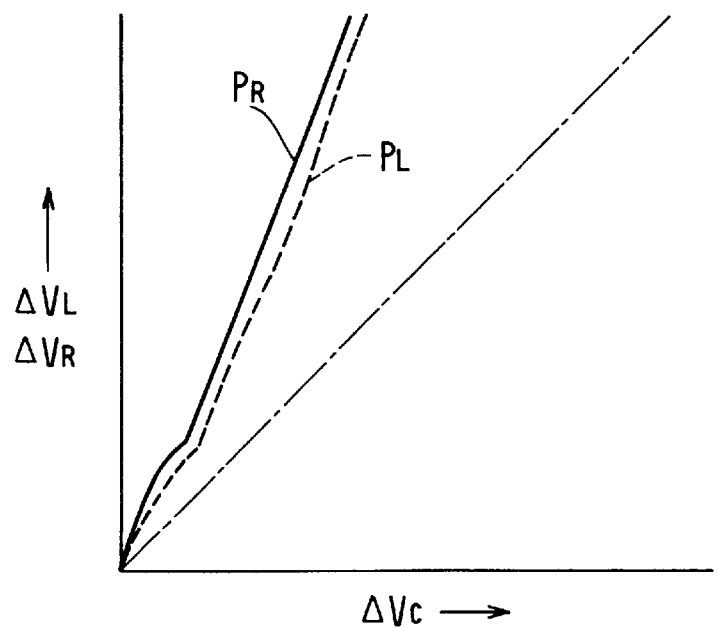
FIG. 5 is a graph showing velocity changes $\Delta V_L$ and $\Delta V_R$ and a velocity change $\Delta V_C$ in a case of a head-on crash.

When the mode of the car crash is the head-on crash for example, the velocity change $\Delta V_R$ which is the integrated output of the integrator 52b and the velocity change $\Delta V_L$ which is the integrated output of the integrator 52c change almost at constant inclination while taking almost the same values as shown by curves $P_R$ and $P_L$ in FIG. 5 after the head-on crash. Further, as it is apparent from FIG. 5, the both velocity changes $\Delta V_R$ and $\Delta V_L$ change while taking values greater than that of the velocity change $\Delta V_C$ which is the integrated output of the integrator 52a.

It means that in a case of the head-on crash, the accelerations detected by the right and left G sensors 40R and 40L rise earlier than the acceleration detected by the center G sensor 30 and there is no phase difference between the integrated outputs of the both integrators 52b and 52c.

Figure 6:
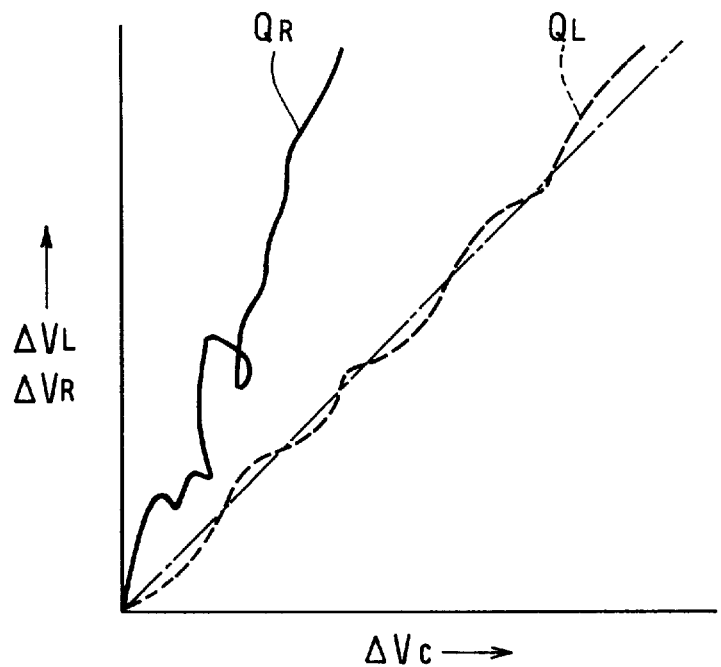
FIG. 6 is a graph showing velocity changes $\Delta V_L$ and $\Delta V_R$ and a velocity change $\Delta V_C$ in a case of either an oblique crash or an offset crash.

When the mode of the car crash is either the oblique crash or the offset crash, for example, when the car crashes against a vehicle running in the opposite direction by the right side thereof, the velocity change $\Delta V_R$ (see a curve $Q_R$ in FIG. 6) which is the integrated output of the integrator 52b changes while taking values greater than those of the velocity change $\Delta V_L$ (see a curve $Q_L$ in FIG. 6) which is the integrated output of the integrator 52c and while changing its inclination more or less as shown in FIG. 6. It is also apparent from FIG. 6 that the velocity change $\Delta V_L$ changes while taking almost equal values with that of the velocity change $\Delta V_C$ which is the integrated output of the integrator 52a.

It means that the acceleration detected by the G sensor 40R rises earlier than the accelerations detected by the other G sensors 30, 40L and there is a phase difference between the integrated outputs of the both integrators 52b and 52c when the car crashes into the obstruction at its right side in a mode of the oblique crash or the offset crash.

Figure 7:
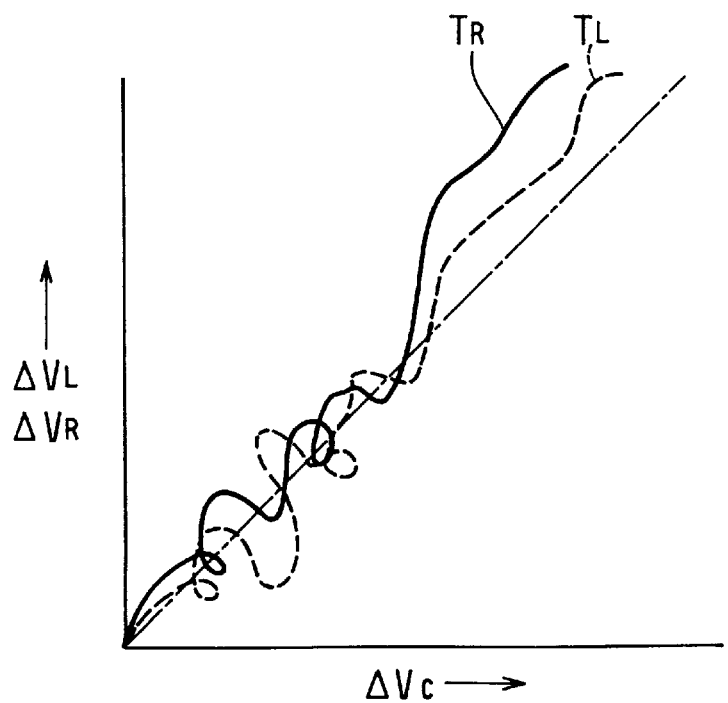
FIG. 7 is a graph showing velocity changes $\Delta V_L$ and $\Delta V_R$ and a velocity change $\Delta V_C$ in a case of either a pole crash or an under-ride crash.

When the mode of the car crash is either the pole crash or the under-ride crash, the velocity change $\Delta V_R$ which is the integrated output of the integrator 52b and the velocity change $\Delta V_L$ which is the integrated output of the integrator 52c change both in complex very much while taking values around the velocity change $\Delta V_L$ which is the integrated output of the integrator 52a as shown by curves $T_R$ and $T_L$ in FIG. 7.

It means that when the mode of the car crash is the pole crash or the under-ride crash, the length of locus of each of the velocity changes $\Delta V_R$ and $\Delta V_L$ is very long while having almost no phase difference between the integrated outputs of the both integrators 52b and 52c. It is possible then to determine the pole crash and the under-ride crash timely while clearly distinguishing them from the other crash modes by the level of the output of the AND gate 70 in the present embodiment.

Figure 8:
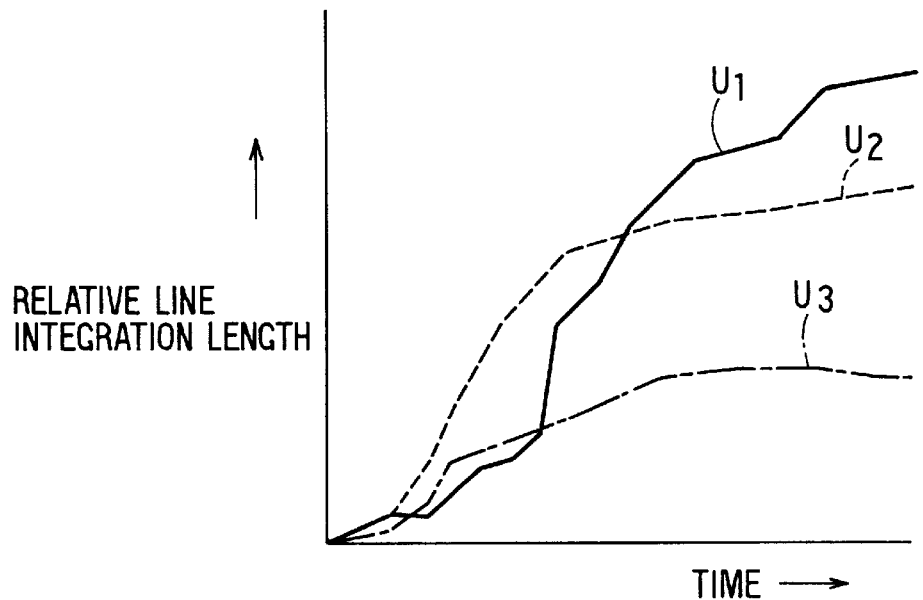
FIG. 8 is a graph showing the relationship between relative line-integrated lengths of velocity changes and an elapse of time in the respective crash modes.

The relationship between of the length of the locus (relative line-integration length) with the locus of the velocity change $\Delta V_C$ as a reference and an elapse of time may be expressed as shown by curves $U_1$, $U_2$ and $U_3$ in FIG. 8. Here, the curve $U_1$ represents the case of either the pole crash or the under-ride crash, the curve $U_2$ represents the case of either the oblique crash or the offset crash and the curve $U_3$ represents the case of the head-on crash.

It is apparent from these curves $U_1$, $U_2$ and $U_3$ that the length of locus is longer in the case of the pole crash or the under-ride crash as compared to the other crash modes.

It is noted that the length of locus of the velocity change $\Delta V$ (relative line integration length) with the locus of the velocity change $\Delta V_C$ as a reference can be calculated by signal processing from the delay elements 53a through 53c to the subtracters 60a and 60b in the crash mode determining circuit Sa in FIG. 3.

The activation unit 10 spreads the air bag B at the timing suitable for the above-mentioned respective crash mode to protect the driver adequately. That is, because the preset threshold values THe and THg in the crash determining circuit Sb are set at the values smaller than the preset threshold values THd and THf, respectively, as described above, the air bag B may be spread earlier in a case of either the pole crash or the under-ride crash as compared to the other crash modes.

Figure 9:
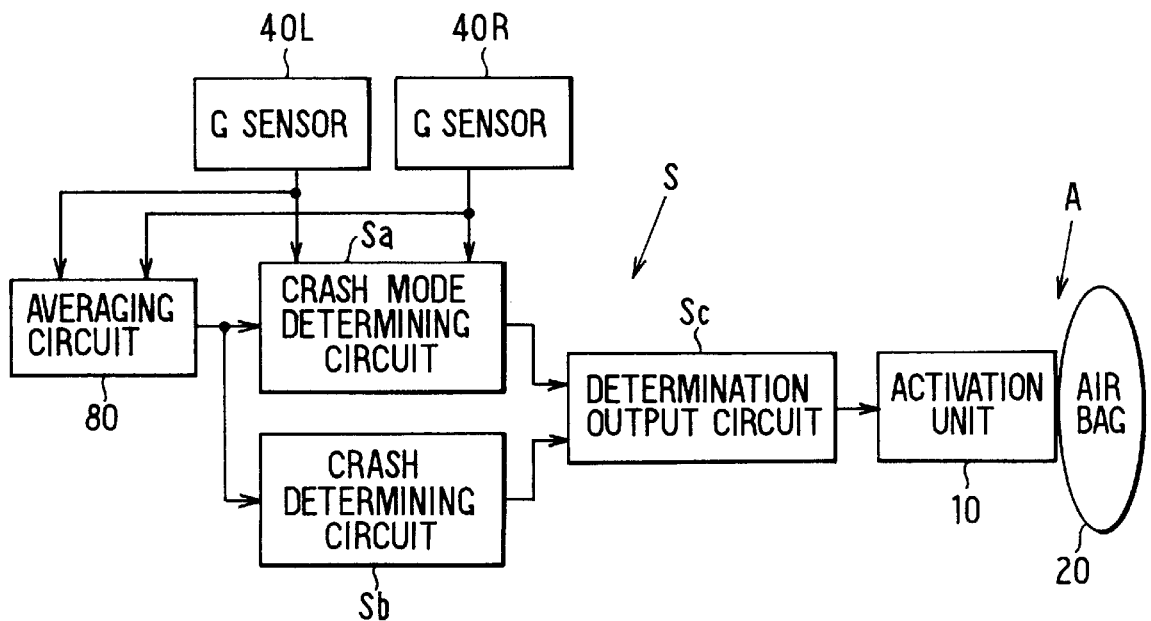
FIG. 9 is a block diagram showing a modification of the first embodiment.
Figure 10:
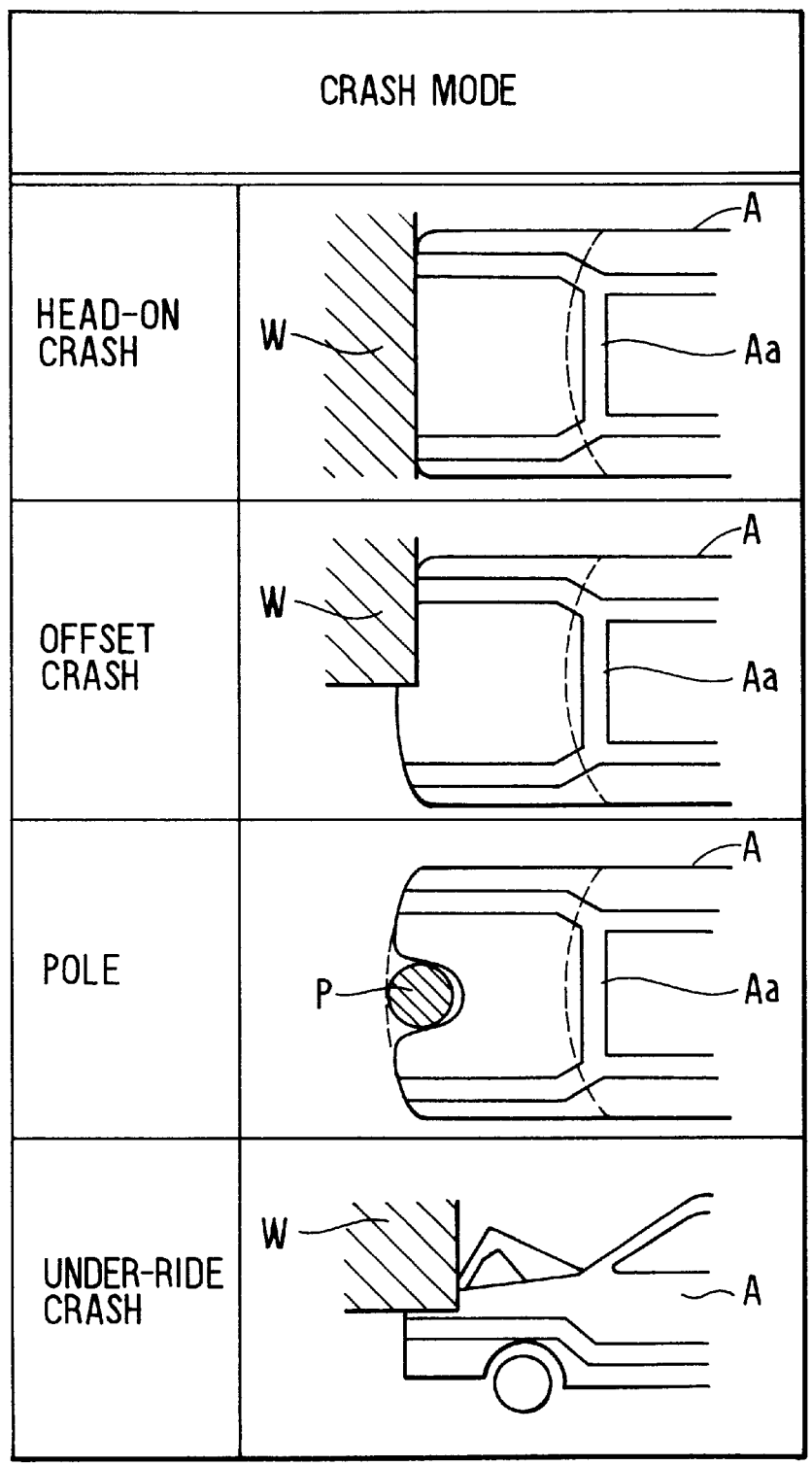
FIG. 10 is a diagrammatic view for explaining the respective car crash modes.
Figure 11:
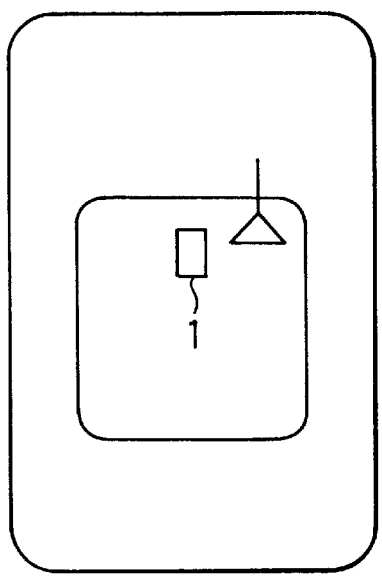
FIG. 11 is a diagrammatic view showing the disposition of a G sensor within a car in a prior art air bag system.
Figure 12:
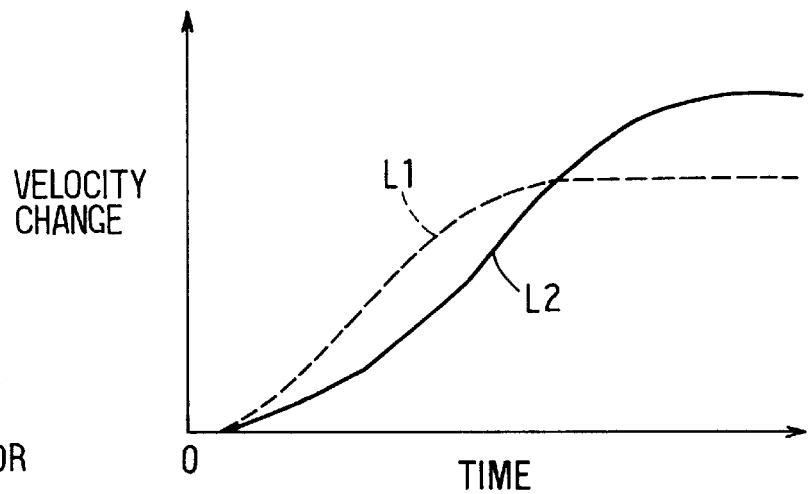
FIG. 12 is a graph showing temporal changes of velocity changes in cases of a head-on crash and a pole crash in the prior art air bag system.

FIG. 9 shows a modification of the foregoing embodiment.

In this modification, an averaging circuit 80 is adopted instead of the center G sensor 30 described in the first embodiment. The averaging circuit 80 calculates an average value of the accelerations detected by the right and left G sensors 40R and 40L and outputs it to the A-D converter 51a. The other structure is the same with that of the first embodiment.

According to this modification, the center G sensor 30 may be eliminated by adopting the averaging circuit 80. The other operations and effects are the same with those of the first embodiment. It is noted that the present invention may be embodied by fixing either one of the right and left G sensors 40R and 40L at the center of the car in the right and left direction and by eliminating the other G sensors when only the pole crash or the under-ride crash is to be determined.

Further, the present invention may be embodied by constructing each circuit element of the crash mode determining circuit Sa and the crash determining circuit Sb by an analog element. It allows the A-D converters 51a through 51c to be eliminated. It is also noted that the present invention may be applied not only to cars but also to the other types of vehicles.

(Second Embodiment)

Next, a second embodiment of the present invention will be explained. In the description of the second embodiment, the background in which an occupant protection system of the second embodiment has been devised will be explained at first and then the occupant protection system of the second embodiment will be explained in detail.

The inventors have found the following points by examining the state of occurrence of acceleration in various car crash modes.

First, it was found that a difference between times at which respective accelerations generated at the front part and the center part in the longitudinal direction of the vehicle rise when the vehicle crashes head-on against an obstruction is very small as compared to a difference between times at which respective accelerations generated at the front part and the center part in the longitudinal direction of the vehicle rise when the vehicle crashes against the obstruction in the mode of the oblique crash for example other than the head-on crash, regardless of the hardness of the obstruction.

Then, it was found that the difference between the rising acceleration times, i.e., a phase difference of the respective accelerations, has a certain relationship with severity of the car crash and the crash severity has a certain relationship with a pressure of inflation for an air bag necessary for protecting the occupant.

It was also found that the phase difference of the respective accelerations decreases (or increases) as the severity of the car crash increases (or decreases). Further, it was found that the air bag may be spread while preventing the spreading air bag from hurting the occupant and protecting the occupant adequately by increasing (or decreasing) the pressure of inflation of the air bag in accordance to the increase (decrease) of severity of the car crash.

Then, the occupant protection system of the second embodiment is provided with a determining unit for determining the condition for actuating an occupant protection unit corresponding to the severity of the car crash by utilizing the phase difference between detected outputs of the respective sensors disposed at the front part and at the center part in the longitudinal direction of the vehicle.

The structure of the occupant protection system of the second embodiment will be explained below briefly. In the occupant protection system, a first acceleration sensor is disposed at the front part of the vehicle and detects, at the front part of the vehicle, acceleration caused by the car crash against an obstruction. A second acceleration sensor is disposed at the center part in the longitudinal direction of the vehicle and detects, at the center part of the vehicle, acceleration caused by the car crash against the obstruction.

An output difference determining device determines whether or not the phase difference between the detection outputs of the first and second acceleration sensors is smaller than a predetermined phase difference. A crash determining device determines whether or not a crash has occurred based on the detection output of the second acceleration sensor and generates a crash determination signal when it is determined that the crash has occurred.

When the crash determination signal is generated and when it is determined that the phase difference between the respective detection outputs is greater than the predetermined phase difference, a determination output device outputs a first determination signal indicative of that the car has crashed with a first severity to the occupant protection unit. When the crash determination signal is generated and when it is determined that the above-mentioned phase difference is smaller than the predetermined phase difference, the determination output device outputs a second determination signal indicative of that the car has crashed with a second severity which is severer than the first severity to the occupant protection unit.

Thus, the severity of the car crash can be determined by utilizing the phase difference between the detection outputs of the respective sensors disposed at the front part and the center part in the longitudinal direction of the vehicle. As a result, the actuating condition of the occupant protection unit can be controlled adequately at least by two levels based on the first and second determination signals. Therefore, it is possible to protect the occupant adequately corresponding to the severity of the crash without hurting the occupant by the actuated occupant protection unit.

Figure 13:
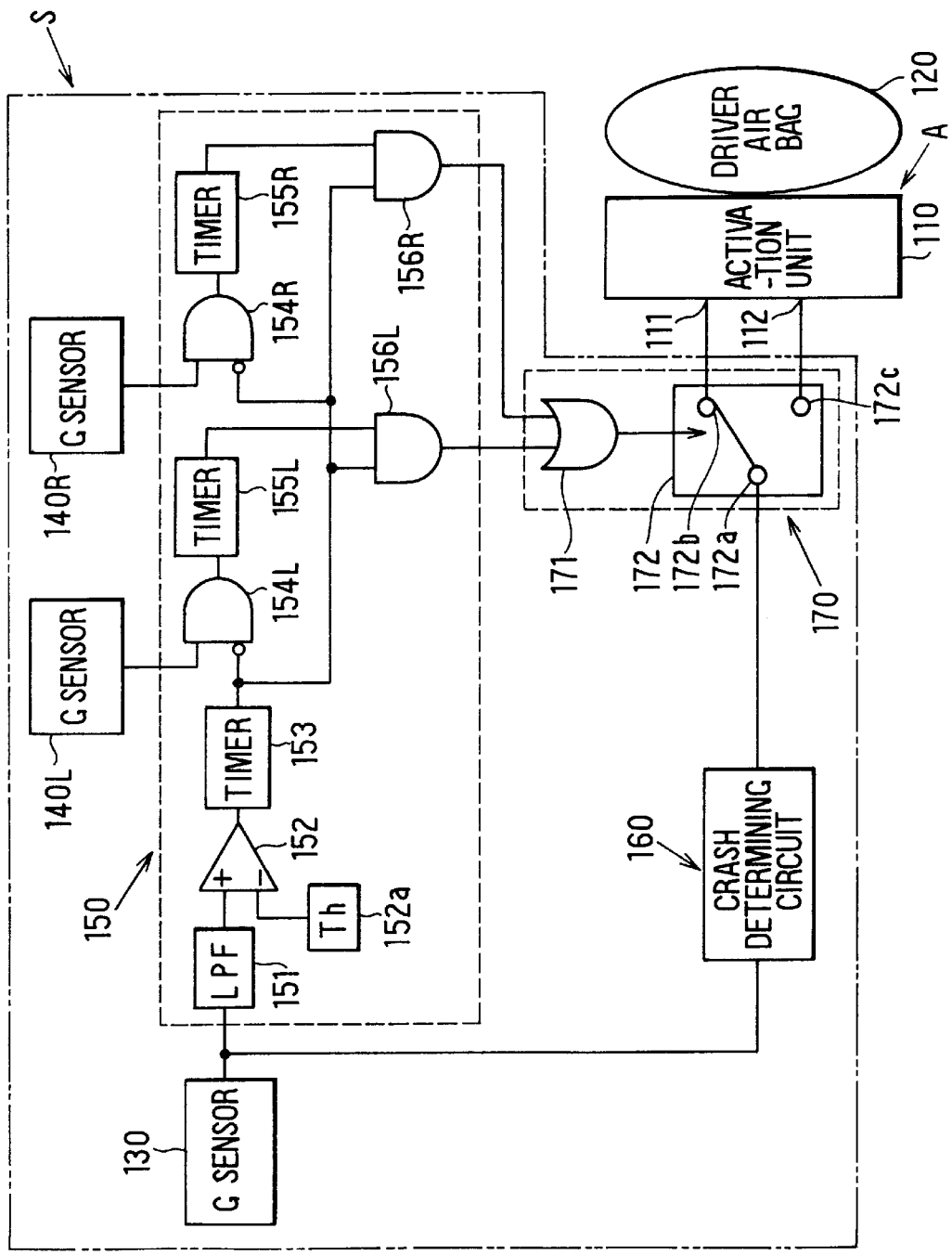
FIG. 13 is a block diagram showing the structure of a second embodiment of the present invention.

The occupant protection system of the second embodiment will be explained below in detail. FIG. 13 shows an example in which the occupant protection system is embodied as a vehicular air bag system.

This air bag system is composed of an air bag unit A and a determining unit S.

The air bag unit A is composed of an activation unit 110 and a driver air bag 120 spread by the activation unit 110. It is noted that the air bag 120 protects an occupant seating on the driver's seat of the vehicle from an impact of a car crash.

Receiving a first determination signal indicative of that the pressure of inflation of the air bag 120 should be low through an input terminal 111 thereof from a crash determining circuit 160 described later, the activation unit 110 spreads the air bag 120 at the low pressure. Further, receiving a second determination signal indicative of that the pressure of inflation of the air bag 120 should be high through an input terminal 112 thereof from the crash determining circuit 160, the activation unit 110 spreads the air bag 120 at the high pressure.

Figure 14:
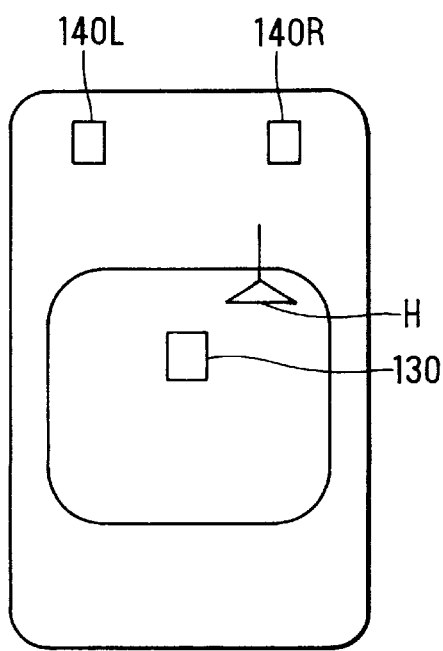
FIG. 14 is a plan view showing the disposition of respective acceleration sensors in FIG. 13 within a car.

The determining unit S comprises an electronic G sensor 130 and mechanical right and left G sensors 140R and 140L. The G sensor 130 is disposed on the bottom floor of the cabin at the center in the longitudinal direction of the car as shown in FIG. 14. The G sensor 130 detects acceleration generated when the car crashes against an obstruction and generates an acceleration signal.

It is noted that the G sensor 130 may be disposed not only on the bottom floor of the cabin but also at any place as long as it is located at the center in the longitudinal direction of the car body. The right and left G sensors 140R and 140L are composed of normally open type switches having the same structure and are disposed on the right and left sides at the front side of an engine room of the car.

Figure 15A:
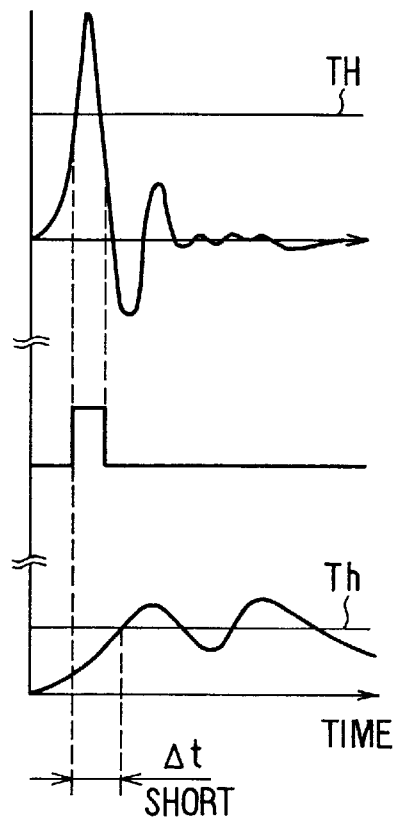
FIG. 15A is a graph showing temporal changes of respective accelerations detected by the acceleration sensors in a case of a head-on crash and FIG. 15B is a graph showing temporal changes of respective accelerations detected by the acceleration sensors in a case of an oblique crash.
Figure 15B:
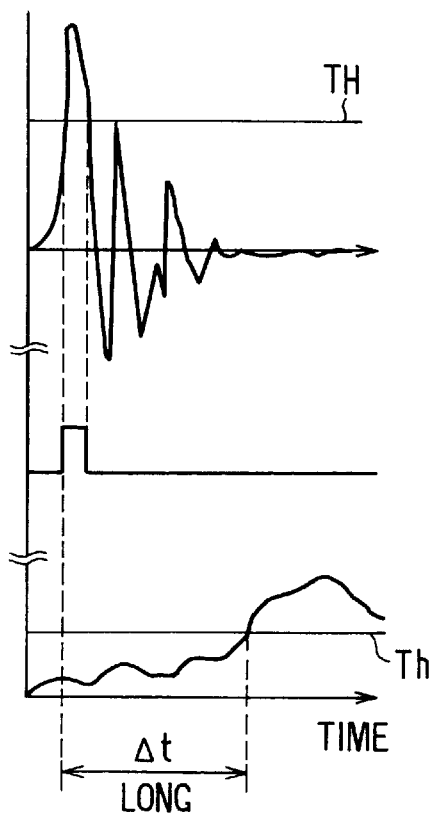

These right and left G sensors 140R and 140L turn on and generate high-level acceleration signals, respectively, when the accelerations generated when the car crashes against an obstruction increase up to a predetermined threshold value TH (see FIGS. 15A and 15B). The symbol H in FIG. 14 denotes a steering wheel of the car.

The determining unit S further comprises a phase determining circuit 150 connected with the G sensor 130, the right and left G sensors 140R and 140L, the crash determining circuit 160 connected with the G sensor 130, and a determination output circuit 170 connected with the phase determining circuit 150 and the crash determining circuit 160.

The phase determining circuit 150 comprises a low pass filter 151 (hereinafter referred to as a LPF 151). The LPF 151 samples low frequency components among frequency components of the acceleration signal of the G sensor 130 generated by the car crash and generates a filtered signal.

A comparator 152 compares the level of the filtered signal of the LPF 151 with a preset threshold value Th of a threshold setting element 152a. When the level of the filtered signal is higher than that of the preset threshold value Th, the comparator 152 outputs a high-level comparison output. This comparison output turns to low level when the level of the filtered signal is below the preset threshold value Th. It is noted that the preset threshold value Th represents a value lower than a lower limit value of the filtered signal caused by the car crash which necessitates the spread of the air bag 120.

A timer 153 starts to count a predetermined time T1 in response to the rise of the comparison output of the comparator 152 and ends it after the elapse of the above-mentioned predetermined time T1. Here, the timer 153 generates a high-level timer signal during the count. It is noted that the above-mentioned predetermined time T1 is a time enough for canceling the state which is not considered to be a car crash like when the output of the G sensor 130 rises earlier than the output of the G sensor 140R or the G sensor 140L.

Based on the rise of the acceleration signal of the G sensor 140L before the timer 153 starts to count the predetermined time T1, an AND gate 154L outputs a high-level gate signal. This gate signal turns to low level as the timer 153 starts to count the predetermined time T1.

Meanwhile, an AND gate 154R outputs a high-level gate signal based on the rise of the acceleration signal of the G sensor 140R before the timer 153 starts to count the predetermined time T1. This gate signal turns to low level as the timer 153 starts to count the time T1.

A timer 155L starts to count a predetermined time T2 based on the occurrence of the high-level gate signal from the AND gate 154L and ends it after the elapse of the predetermined time T2. During the count, the timer 155L generates a high-level timer signal.

Meanwhile, a timer 155R starts to count the predetermined time T2 based on the occurrence of the high-level gate signal from the AND gate 154R and ends it after the elapse of the predetermined time T2. During the count, the timer 155R generates a high-level timer signal.

The predetermined time T2 is set at a time enough for the acceleration signal of the G sensor 130 to rise as the car crashes against the obstruction severely. The AND gate 156L outputs the high-level gate signal when the timer signals of the both timers 153 and 155L are at high level. The gate signal of the AND gate 156L is at low level before the timer signal of either the timer 153 or the timer 155L is generated and after the generation thereof is stopped.

Meanwhile, the AND gate 156R outputs the high-level gate signal when the timer signals of the both timers 153 and 155R are at high level. The gate signal of the AND gate 156R is at low level before the timer signal of either the timer 153 or the timer 155R is generated and after the generation thereof is stopped.

The crash determining circuit 160 determines whether or not such a car crash that requires the spread of the air bag 120 has occurred based on the acceleration signal of the G sensor 130 and generates a crash determination signal. This crash determination signal acts as the above-mentioned first determination signal when it is given to the input terminal 111 of the activation unit 110 and acts as the second determination signal when it is given to the input terminal 112.

Here, the first determination signal corresponds to the crash modes such as the oblique crash other than the head-on crash against the obstruction. The second determination signal corresponds to the head-on crash against the obstruction.

The determination output circuit 170 comprises an OR gate 171 and a change-over analog switch 172. The OR gate 171 outputs a high-level gate signal to a control terminal of the analog switch 172 when either one of gate signals of the AND gates 156L and 156R is at high level. When the gate signal from the OR gate 171 is at low level, the analog switch 172 provides the crash determination signal of the crash determining circuit 160 to the input terminal 111 of the activation unit 110 via an input terminal 172a and an output terminal 172b of the analog switch 172. When the gate signal from the OR gate 171 is at high level, the analog switch 172 provides the crash determination signal of the crash determining circuit 160 to the input terminal 112 of the activation unit 110 via the input terminal 172a and an output terminal 172c of the analog switch 172.

It is supposed that the car equipped with the vehicular air bag system constructed as described above crashes head-on against an obstruction.

At this time, the right and left G sensors 140R and 140L and the G sensor 130 generate acceleration signals, respectively. Because the car crashes head-on against the obstruction in this case, a phase difference Δt between the phase of the accelerations detected by the right and left G sensors 140R and 140L and the phase of the acceleration detected by the G sensor 130 is small (see FIG. 15A) even though the accelerations detected by the G sensors 140R and 140L rise slightly earlier than the acceleration detected by the G sensor 130.

It means that the severity of the impact caused by the head-on crash of the car is large. Due to that, the timer 153 starts to count time promptly after the counts of the respective timers 155R and 155L are started. That is, the G sensors 140R and 140L generate high-level acceleration signals before the timer 153 starts to count time and in correspondence to that, the respective AND gates 154R and 154L generate high-level gate signals. Along that, the timers 155R and 155L start to count the predetermined time T2, respectively. Then, the both timers 155R and 155L generate high-level timer signals as they start to count time, respectively. At this time, the timer signal of the timer 153 is at low level, so that the respective gate signals of the both AND gates 156R and 156L are at low level.

When a time corresponding to the phase difference Δt shown in FIG. 15A elapses, the timer 153 starts to count the predetermined time T1 and generates a high-level timer signal. Therefore, the gate signals of the respective AND gates 156R and 156L turn to high level. Then, the OR gate 171 outputs a high-level gate signal to the analog switch 172 based on the respective gate signals of the AND gates 156R and 156L.

The crash determining circuit 160 determines whether the car crash has occurred based on the acceleration signal of the G sensor 130 and generates the crash determination signal when it determines that the car crash has occurred.

The severity of the head-on crash is large. Therefore, the pressure of inflation of the air bag 120 must be high.

When the OR gate 171 outputs the high-level gate signal to the analog switch 172, the analog switch 172 provides the above-mentioned crash determination signal to the input terminal 112 of the activation unit 110 via the input terminal 172a and the output terminal 172c thereof as the second determination signal.

The air bag 120 spreads by receiving high pressure from the activation unit 110. Thereby, it is possible to protect the driver adequately from the impact caused by the head-on crash of the car.

Next, suppose that the car crashes obliquely against the obstruction by the left side thereof. Then, the G sensor 140L and the G sensor 130 generate acceleration signals, respectively. Because the car has crashed obliquely by the left side thereof, the rising acceleration time of the acceleration detected by the G sensor 140L is much earlier than the rising acceleration time of the acceleration detected by the G sensor 130. Still more, a phase difference Δt between the phase of the acceleration detected by the G sensor 140L and the phase of the acceleration detected by the G sensor 130 is very large (see FIG. 15B).

It means that the severity of the impact caused by the oblique crash is small. Therefore, the timer 153 starts to count time after the timer 155L ends to count time. That is, the G sensor 140L generates a high-level acceleration signal and outputs it to the AND gate 154L before the timer 153 starts to count time. In response to that, the timer 155L starts to count the predetermined time T2 and generates a high-level timer signal. At this time, the timer signal of the timer 153 is at low level. As a result, the gate signal of the AND gate 156L is at low level.

Then, after the timer signal of the timer 155L turns to low level after the elapse of a time corresponding to the predetermined time T2, the timer 153 starts to count the predetermined time T1 and generates a high-level timer signal.

As a result, the gate signal of the AND gate 156L is kept at low level and the gate signal of the OR gate 171 is also kept at low level.

Then, the crash determining circuit 160 determines the occurrence of the car crash based on the acceleration signal of the G sensor 130 and generates the crash determination signal.

Here, the severity of the impact of the oblique crash is small, and the pressure of inflation of the air bag 120 may be low accordingly.

When the gate signal of the OR gate 171 is kept at low level, the analog switch 172 provides the above-mentioned crash determination signal to the input terminal 111 of the activation unit 110 as the first determination signal via the input terminal 172a and the output terminal 172b thereof.

Along that, the air bag 120 spreads by receiving the low pressure from the activation unit 110 and thereby, can protect the driver from the impact caused by the oblique crash at the left side of the car. Because the pressure of inflation given from the activation unit 110 to the air bag 120 is low, it will be harmless to the driver.

As described above, in the second embodiment, the pressure of inflation given from the activation unit 110 to the air bag 120 is controlled in two levels in correspondence to the oblique crash and the head-on crash by discriminating the oblique crash from the head-on crash. It then allows the air bag 120 to protect the driver adequately and harmlessly regardless of the hardness of the obstruction.

The above-mentioned operations and effects may be achieved in the same manner also when the car crashes obliquely against the obstruction at the right side thereof.

The above-mentioned two-level pressure control may be achieved reliably by setting the preset threshold value Th at a value lower than a crash determining threshold value in the crash determining circuit 160 because the determination in the phase determining circuit 150 can be performed earlier than the determination in the crash determining circuit 160.

It is noted that although the case when the timer 153 is adopted has been explained in the second embodiment, the timer 153 may be eliminated. Still more, although the G sensor 130 has been an electronic sensor and the G sensors 140R and 140L have been mechanical sensors in the second embodiment, the present invention is not limited to such a case and the G sensor 130 may be a mechanical sensor and the G sensors 140R and 140L may be electronic sensors. That is, the respective G sensors 130, 140R and 140L may be electronic or mechanical sensors.

(Third Embodiment)

Figure 16:
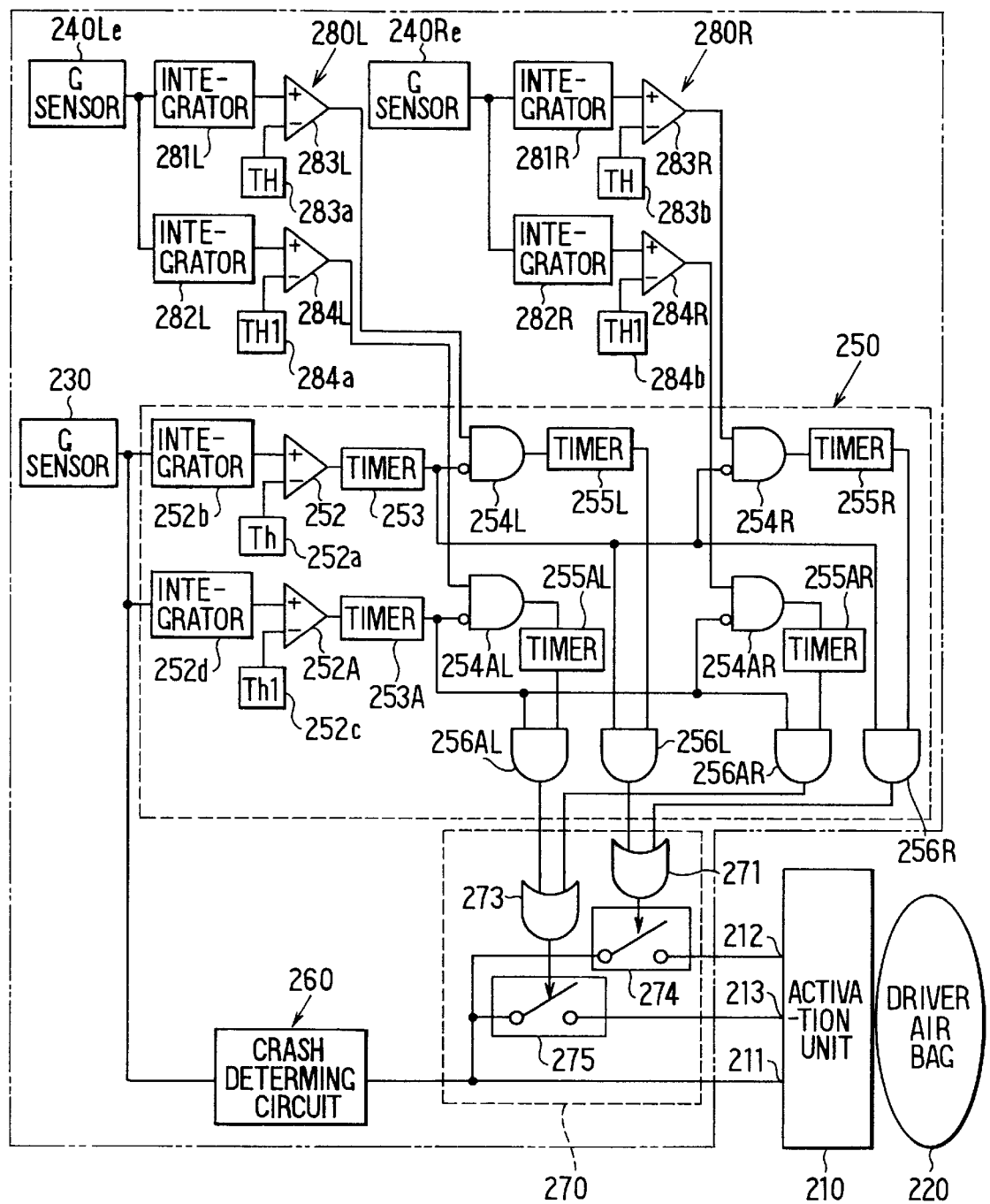
FIG. 16 is a block diagram showing the structure of a third embodiment of the present invention.

Next, a third embodiment of the present invention will be explained with reference to FIG. 16.

In the third embodiment, electronic right and left G sensors 240Re and 240Le are used instead of the G sensors 140R and 140L described in the second embodiment and are disposed on the right and left side at the front part of the car. These right and left G sensors 240Re and 240Le detect accelerations caused by a car crash and generates acceleration signals.

Further, a phase determining circuit 250, a crash determining circuit 260 and an activation unit 210 are adopted instead of the phase determining circuit 150, the crash determining circuit 160 and the activation unit 110 described in the second embodiment. Further, signal processing circuits 280R and 280L are connected between the G sensors 240R and 240L and the phase determining circuit 250.

The signal processing circuit 280L comprises two integrators 281L and 282L. The integrators 281L and 282L integrate the acceleration signal of the G sensor 240Le and generate integration signals. It is noted that an integration time of the integrator 281L is set at a time shorter than an integration time of the integrator 282L.

A comparator 283L compares the level of the integration signal of the integrator 281L with a preset threshold value TH (see FIGS. 15A and 15B) of a threshold setting element 283a. When the level of the integration signal of the integrator 281L is lower than the preset threshold value TH, the comparison output of the comparator 283L turns to low level. When the level of the integration signal of the integrator 281L is higher than the preset threshold value TH, the comparison output of the comparator 283L turns to high level.

Meanwhile, a comparator 284L compares the level of the integration signal of the integrator 282L with a preset threshold value TH1 of a threshold setting element 284a. When the level of the integration signal of the integrator 282L is lower than the preset threshold value TH1, the comparison output of the comparator 284L turns to low level. When the level of the integration signal of the integrator 282L is higher than the preset threshold value TH1, the comparison output of the comparator 284L turns to high level.

Here, the preset threshold value TH1 is set at a value lower than the preset threshold value TH.

Meanwhile, the signal processing circuit 280R comprises two integrators 281R and 282R. The integrators 281R and 282R integrate the acceleration signal of the G sensor 240Re and generate integration signals. It is noted that integration times of the integrators 281R and 282R are equal to the integration times of the integrators 281L and 282L, respectively.

A comparator 283R compares the level of the integration signal of the integrator 281R with a preset threshold value TH of a threshold setting element 283b. When the level of the integration signal of the integrator 281R is lower than the preset threshold value TH, the comparison output of the comparator 283R turns to low level. When the level of the integration signal of the integrator 281R is higher than the preset threshold value TH, the comparison output of the comparator 283R turns to high level.

Meanwhile, a comparator 284R compares the level of the integration signal of the integrator 282R with a preset threshold value TH1 of a threshold setting element 284b. When the level of the integration signal of the integrator 282R is lower than the preset threshold value TH1, the comparison output of the comparator 284R turns to low level. When the level of the integration signal of the integrator 282R is higher than the preset threshold value TH1, the comparison output of the comparator 284R turns to high level.

The phase determining circuit 250 comprises two integrators 252b and 252d. The integrators 252b and 252d integrate the acceleration signal of the G sensor 230 and generate integration signals. It is noted that an integration time of the integrator 252d is set at a time longer than an integration time of the integrator 252b.

A comparator 252 compares the level of the integration signal of the integrator 252b with a preset threshold value Th of a threshold setting element 252a. When the level of the integration signal of the integrator 252b is lower than the preset threshold value Th, the comparison output of the comparator 252 turns to low level. When the level of the integration signal of the integrator 252b is higher than the preset threshold value Th, the comparison output of the comparator 252 turns to high level.

Meanwhile, a comparator 252A compares the level of the integration signal of the integrator 252d with a preset threshold value Th1 of a threshold setting element 252c. When the level of the integration signal of the integrator 252d is lower than the preset threshold value Th1, the comparison output of the comparator 252A turns to low level. When the level of the integration signal of the integrator 252d is higher than the preset threshold value Th1, the comparison output of the comparator 252A turns to high level.

It is noted that the preset threshold value Th1 is set at a value lower than the preset threshold value Th.

AND gates 254L and 254R output high-level gate signals, respectively, based on the rises of the comparison outputs of the comparators 283L and 283R before a timer 253 starts to count time. These gate signals turn to low level as the timer 253 starts to count time.

Meanwhile, AND gates 254AL and 254AR output high-level gate signals, respectively, based on the rises of the comparison outputs of the comparators 284L and 284R before a timer 253A starts to count time. These gate signals turn to low level as the timer 253A starts to count time.

The timers 253 and 253A start to count the predetermined time T1 in response to the rises of the comparison outputs of the comparators 252 and 252A, respectively. Each of the timers 253 and 253A ends the count as the predetermined time T1 elapses. The timers 253 and 253A output high-level timer signals during the count.

The timers 255L and 255R start to count a predetermined time T2 based on the high-level gate signals from the AND gates 254L and 254R, respectively. Each of the timers 255L and 255R ends the count as the predetermined time T2 elapses. The timers 255L and 255R generate high-level timer signals during the count.

Meanwhile, the timers 255AL and 255AR start to count the predetermined time T2 based on the high-level gate signals from the AND gates 254AL and 254AR, respectively. Each of the timers 255AL and 255AR ends the count as the predetermined time T2 elapses. The timers 255AL and 255AR generate high-level timer signals during the count.

AND gates 256L and 256R generate high-level gate signals when the timer signal of the timer 253 is at high level and the timer signals of the timers 255L and 255R are at high level, respectively. Each of these gate signals is at low level before either one of the timer signals of the timer 253 and the timer 255L or 255R is generated and after when its generation is stopped.

Meanwhile, AND gates 256AL and 256AR generate high-level gate signals when the timer signal of the timer 253A is at high level and the timer signals of the timers 255AL and 255AR are at high level, respectively. Each of these gate signals is at low level before either one of the timer signals of the timer 253A and the timer 255AL or 255AR is generated and after when its generation is stopped.

The crash determining circuit 260 determines whether or not a car crash which requires the air bag 220 to be spread has occurred based on the acceleration signal of the G sensor 230 and generates the crash determination signal.

The determination output circuit 270 comprises two OR gates 271 and 273 and two analog switches 274 and 275. The OR gate 273 outputs a high-level gate signal to a control terminal of the analog switch 275 when either one of the gate signals of the AND gates 256AL and 256AR is at high level.

When the gate signal from the OR gate 271 is at high level, the analog switch 274 turns on and transmits the crash determination signal of the crash determination circuit 260 as a second judgment signal to an input terminal 212 of the activation unit 210.

When the gate signal from the OR gate 273 is at high level, the analog switch 275 turns on and transmits the crash determination signal of the crash determining circuit 260 as a third determination signal to an input terminal 213 of the activation unit 210.

When the both analog switches 274 and 275 are not ON, the determination output circuit 270 transmits the crash determination signal of the crash determining circuit 260 as a first determination signal only to an input terminal 211 of the activation unit 210.

When the activation unit 210 receives the crash determination signal (first determination signal) only through the input terminal 211 thereof, it spreads the air bag 220 at low pressure. When the activation unit 210 receives the crash determination signal (second determination signal) through the input terminals 211 and 212 thereof, it spreads the air bag 220 at high pressure. Still more, when the activation unit 210 receives the crash determination signal (third determination signal) through the input terminals 211 and 213 thereof, it spreads the air bag 220 at intermediate pressure.

It is noted that the intermediate pressure is used for inflating the air bag 220 when the offset crash occurs. The other arrangements are the same with those in the second embodiment.

Suppose that the car equipped with the vehicular air bag system constructed as described above crashes head-on against the obstruction. Then, the G sensors 240Re and 240Le and the G sensor 230 generate acceleration signals, respectively.

The integrators 281L and 282L of the signal processing circuit 280L integrate the acceleration signal of the G sensor 240Le and generate integration signals, respectively. Then, the comparator 283L compares the level of the integration signal of the integrator 281L with the preset threshold value TH of the threshold setting element 283a and the comparator 284L compares the level of the integration signal of the integrator 282L with the preset threshold value TH1 of the threshold setting element 284a.

Here, when the level of the integration signal exceeds the preset threshold value TH when the integration time of the integrator 281L elapses, the comparison output of the comparator 283L turns to high level. Meanwhile, when the level of the integration signal exceeds the preset threshold value TH1 when the integration time of the integrator 282L elapses, the comparison output of the comparator 284L turns to high level.

It is noted that the similar signal processing is carried out also in the signal processing circuit 280R in a case of the head-on crash.

In the phase determining circuit 250, the integrators 252b and 252d integrate the acceleration signal of the G sensor 230 and generate integration signals, respectively. Then, the comparators 252 and 252A compare the levels of the integration signals of the integrators 252b and 252d with the preset threshold value Th and the preset threshold value Th1 of the threshold setting elements 252a and 252c, respectively.

When the level of the integration signal exceeds the preset threshold value Th when the integration time of the integrator 252b elapses, the comparison output of the comparator 252 turns to high level. Meanwhile, when the level of the integration signal exceeds the preset threshold value Th1 when the integration time of the integrator 252d elapses, the comparison output of the comparator 252A turns to high level.

When the car crashes head-on against the obstruction, a phase difference Δt between the phase of the accelerations detected by the right and left G sensors 240Re and 240Le and the phase of the acceleration detected by the G sensor 230 is small similarly to the second embodiment. Therefore, the severity of the impact caused by the head-on crash of the car is large.

In this case, the timers 255L and 255R start to count the predetermined time T2 based on the accelerations detected by the right and left G sensors 240Re and 240Le. It is noted that the timers 255AR and 255AL start to count the predetermined time T2 after the elapse of the integration time of the integrators 282L and 282R.

The timers 255L and 255R generate the high-level timer signals as they start to count the time T2. At this time, the timer signal of the timer 253 is at low level. Therefore, the respective gate signals of the both AND gates 256R and 256L are at low level.

Then, because the integration time of the integrator 252d is longer than that of the integrator 252b, the rise of the comparison output of the comparator 252A becomes late as compared to the rise of the comparison output of the comparator 252. As a result, the timer 253A starts to count the time late as compared to the timer 253.

Therefore, when the gate signals of the two AND gate 256L and 256R turn to high level, the gate signals of the two AND gates 256AL and 256AR are kept to be at low level. Therefore, the OR gate 271 outputs the high-level gate signal to the analog switch 274 based on the respective gate signals of the AND gates 256R and 256L.

Then, the crash determining circuit 260 determines the car crash based on the acceleration signal of the G sensor 230 and generates the crash determination signal. Therefore, the crash determination signal is given to the input terminals 212 and 211 of the activation unit 210 via the analog switch 274.

As a result, the air bag 220 spreads by receiving high pressure from the activation unit 210. Thereby, it is possible to protect the driver adequately from the impact caused by the head-on crash of the car similarly to the second embodiment.

Next, suppose that the car crashes obliquely against the obstruction by the left side thereof. Then, the G sensor 240Le and the G sensor 230 generate acceleration signals, respectively. At this time, the acceleration detected by the G sensor 240Le rises very quickly as compared to the acceleration detected by the G sensor 230. Then, a phase difference Δt between the phase of the acceleration detected by the G sensor 240Le and the phase of the acceleration detected by the G sensor 230 is very large (see FIG. 15B).

That is, the severity of the impact caused by the oblique crash by the left side of the car is small.

In this case, the comparison output of the comparator 284L turns to high level after the comparison output of the comparator 283L turns to high level. At this time, neither the timer 253 nor the timer 253A in the phase determination circuit 250 start to count time. In response to the high-level comparison outputs of the comparators 283L and 284L, the gate signal of the AND gate 254AL turns to high level after the gate signal of the AND gate 254L turns to high level.

Along that, the timer 255L starts to count the predetermined time T2 and generates a high-level timer signal.

After that, timer 255AL starts to count the predetermined time T2 and generates a high-level timer signal. At this time, the timer signals of the both timers 253 and 253A are still at low level. Therefore, the gate signals of the both AND gate 256L and 256AL are also kept to low level.

After the timer signals of the timers 255L and 255AL turn to low level, a time corresponding to the phase difference Δt (see FIG. 15B) elapses. Then, the both timers 253 and 253A start to count the predetermined time T1 and generates high-level timer signals, respectively.

Therefore, the gate outputs of the both AND gates 256L and 256AL are kept at low level. Accordingly, the both analog switches 274 and 275 are kept OFF.

Meanwhile, the crash determining circuit 260 determines the car crash based on the acceleration signal of the G sensor 230 and generates the crash determination signal. Therefore, the determination output circuit 270 provides the crash determination signal only to the input terminal 211 of the activation unit 210.

Along that, the air bag 220 spreads by receiving the low pressure from the activation unit 210 and thereby, can protect the driver from the impact caused by the oblique crash at the left side of the car similarly to the second embodiment.

It is noted that the above-mentioned effect may be achieved in the same manner also when the car crashes obliquely against the obstruction by the right side thereof.

Next, suppose that the car crashes in offset against the obstruction by the left side thereof. Along that, the both G sensor 240L*e* and the G sensor 230 generate acceleration signals, respectively. The acceleration detected by the G sensor 240L*e* rises in the similar manner with the case of the oblique crash at the left side of the car. However, the rise of the acceleration detected by the G sensor 230 is faster than the case of the oblique crash.

Accordingly, the phase difference Δt between the phase of the acceleration detected by the G sensor 240L*e* and the phase of the acceleration detected by the G sensor 230 is an inbetween of the phase difference shown in FIG. 15A and the phase difference shown in FIG. 15B. It means that the severity of the impact caused by the offset crash of the car is intermediate between those of the head-on crash and the oblique crash.

Before the both timers 253 and 253A of the phase determining circuit 250 start to count time, the gate signal of the AND gate 254L turns to high level at first and then the gate signal of the AND gate 254AL turns to high level. Accordingly, the count starting timing of the timer 255L is faster than that of the timer 255AL. Therefore, when the high-level gate signals are outputted from the timers 253 and 253A after the above-mentioned phase difference Δt, the timer 255L ends to count time and only the 255AL continues to count time.

Therefore, only the gate signal of the AND gate 256AL turns to high level and the gate signal of the AND gate 256 is kept at low level. As a result, the signal is given to the control terminal of the analog switch 275 via the OR gate 273 and then the analog switch 275 is closed.

Meanwhile, the crash determining circuit 260 determines the car crash based on the acceleration signal of the G sensor 230 and generates the crash determination signal. Therefore, the crash determination signal is given to the input terminal 213 of the activation unit 210 via the analog switch 275 as well as to the input terminal 211 thereof.

As a result, the air bag 220 spreads by receiving the intermediate pressure from the activation unit 210 and thereby, can protect the driver from the impact caused also by the offset crash at the left side of the car.

That is, the pressure of inflation given from the activation unit 210 to the air bag 220 can be controlled in three levels by discriminating the head-on crash, the offset crash and the oblique crash as described above. As a result, it allows the air bag 220 to protect the driver adequately and harmlessly regardless of the hardness or softness of the obstruction.

It is noted that the above-mentioned effect may be achieved in the same manner also when the car crashes in offset against the obstruction by the right side thereof. The other operations and effects are substantially the same as those described in the second embodiment.

(Fourth Embodiment)

Figure 17:
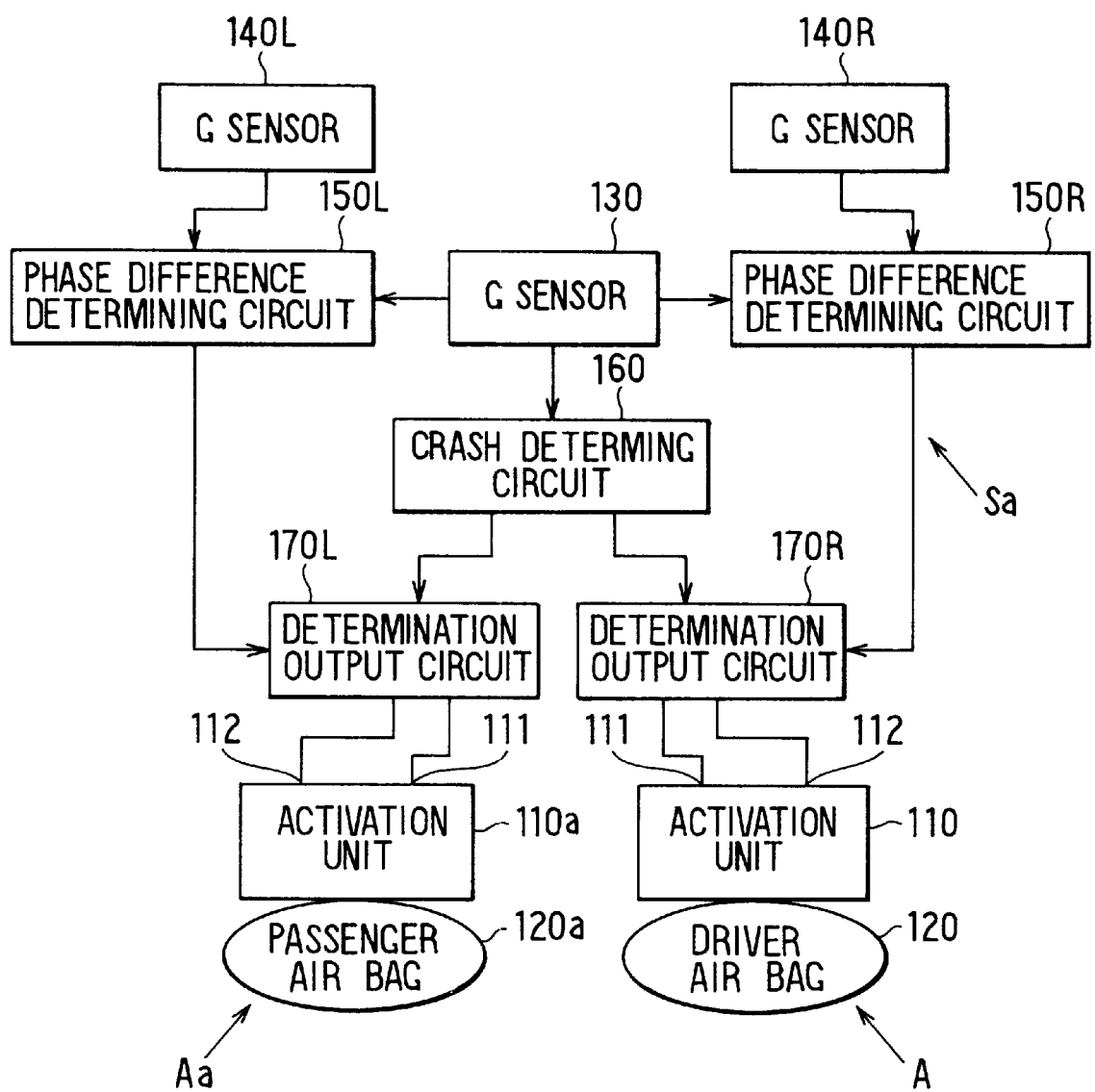
FIG. 17 is a block diagram showing the structure of a fourth embodiment of the present invention.

FIG. 17 shows a fourth embodiment of the present invention.

In the fourth embodiment, an air bag unit Aa is adopted in addition to the air bag unit A described in the second embodiment and a determining unit Sa is adopted instead of the determining unit S described in the second embodiment.

The air bag unit Aa is composed of an activation unit 110*a* and an air bag 120*a*. The activation unit 110*a* is constructed in the same manner at the aforementioned activation unit 110. The air bag 120*a* is used to protect an occupant seating on the passenger's seat.

The determining unit Sa adopts two phase determining circuits 150R and 150L and two determination output circuits 170R and 170L.

The phase determining circuit 150L has a structure in which the AND gate 154R, the timer 155R and the AND gate 156R are eliminated from the phase determining circuit 150 in FIG. 13. Meanwhile, the phase determining circuit 150R has a structure in which the AND gate 154L, the timer 155L and the AND gate 156L are eliminated from the phase determining circuit 150 in FIG. 13.

The phase determining circuit 150L performs the phase determining process similarly to that described in the second embodiment based on the acceleration signals of the G sensor 140L and the G sensor 130 (except the acceleration signal of the G sensor 140R). Meanwhile, the phase determining circuit 150R performs the phase determining process similarly to that described in the second embodiment based on the acceleration signals of the G sensor 140R and the G sensor 130 (except the acceleration signal of the G sensor 140L).

The both determination output circuits 170R and 170L have the same structure in which the OR gate 171 is eliminated from the structure of the determination output circuit 170 in the second embodiment.

The determination output circuit 170L provides the crash determination signal of the crash determining circuit 160 to the input terminal 111 of the activation unit 110*a* from the output terminal 172*b* of the analog switch 172 when a gate output of the AND gate 156L of the phase determining circuit 150L is at low level. The determination output circuit 170L provides the crash determination signal to the input terminal 112 of the activation unit 110*a* from the output terminal 172*c* of the analog switch 172 when the gate output of the AND gate 156L of the phase determining circuit 150L is at high level.

Meanwhile, the determination output circuit 170R provides the crash determination signal of the crash determining circuit 160 to the input terminal 111 of the activation unit 110 from the output terminal 172*b* of the analog switch 172 when a gate output of the AND gate 156R of the phase determining circuit 150R is at low level. The determination output circuit 170R provides the crash determination signal to the input terminal 112 of the activation unit 110 from the output terminal 172*c* of the analog switch 172 when the gate output of the AND gate 156R of the phase determining circuit 150R is at high level.

The other structure of the forth embodiment is the same as that described in the second embodiment.

In the fourth embodiment arranged as described above, the G sensor 140L, the phase determining circuit 150L, the determination output circuit 170L and the activation unit 110*a* are used to spread the air bag 120*a* for the protection of the passenger. Meanwhile, the G sensor 140R, the phase determining circuit 150R, the determination output circuit 170R and the starter unit 110 are used to spread the air bag 120 for the protection of the driver. Thereby, the operation similar to that described in the second embodiment may be assured independently per the passenger and the driver.

In this case, it is possible to discriminate and determine the various crash modes by determining the phase difference between the respective acceleration signals of the G sensors 140R and 140L.

It is noted that a number of the G sensors disposed at the front part of the car is not limited only to two, and the present invention may be embodied by setting one or three or more sensors. In such cases, the G sensor is disposed at the center of the front part of the car when one sensor is to be disposed and the third G sensor is disposed at the center of the front part of the car when three G sensors are to be disposed. The pressure of inflation given to the air bag may be controlled in multi-levels by modifying the circuit structure of the phase determining circuits 150 and 150A and the crash determining circuits 160 and 160A accordingly.

Although the phase difference between the phase of the output detected by the G sensor 140L, 240L$e$, 140R or 240R$e$ and the phase of the output detected by the G sensor 130 or 230 has been detected directly in the second through fourth embodiments, the phase difference may be detected indirectly by detecting a difference of outputs between the output detected by the G sensor 140L, 240L$e$, 140R or 240R$e$ and the output detected by the G sensor 130 or 230. The same effect with the second through fourth embodiments may be achieved by controlling the output of each determination signal from the determination output circuit 170 or 270 to the activation unit 110, 210 or 110$a$ based on such difference of outputs.

It is noted that the present invention may be embodied by applying not only to the vehicular air bag system but also to a vehicular occupant protection system such as a pretensioner of a vehicular seat belt. Further, the present invention may be embodied by applying not only to cars but also to various kinds of vehicles.

In the second to fourth embodiments, the phase difference between the phase of the output detected by the G sensor 140L, 240L$e$, 140R or 240R$e$ and the phase of the output detected by the G sensor 130 or 230 has been detected, and pressure of inflation given from the activation unit 110, 210 to the air bag 120, 220 is controlled in two or more levels in accordance with the detected phase difference. However, as described in the first embodiment, a threshold value for determining whether the car crash has occurred may be changed in accordance with the detected phase difference, instead of controlling pressure of inflation given to the air bag, in the second to fourth embodiments. Further, the change of the threshold value and the control of the inflation pressure may be carried out simultaneously in the second to fourth embodiments.

In the same manner, pressure of inflation given from the activation unit 10 to the air bag 20 may be controlled in two or more levels in accordance with the determined crash mode, instead of changing the threshold value for determining the car crash, in the first embodiment. Further, the change of the threshold value and the control of the inflation pressure may be carried out simultaneously in the first embodiment.

While the described embodiments represent the preferred forms of the present invention, it is to be understood that modifications will occur to those skilled in that art without departing from the spirit of the invention. The scope of the invention is therefore to be determined solely by the appended claims.

What is claimed is:

1. A crash mode determining unit of a vehicular occupant protection system comprising:
   first and second acceleration sensors disposed on both sides of a vehicle in a lateral direction thereof so as to detect accelerations generated at the both sides of the vehicle when the vehicle crashes;
   a third acceleration sensor disposed almost at a center of the vehicle in longitudinal and lateral directions thereof to detect acceleration generated almost at the center of the vehicle;
   first to third integrating devices for respectively integrating the accelerations detected by the first to third acceleration sensors to generate integrated outputs;
   a relative line integration length calculating device for calculating a relative line integration length of at least one of the integrated outputs of the first and second integrating devices with respect to the integrated output of the third integrating device;
   a phase difference calculating device for calculating a phase difference between the integrated outputs of the first and second integrating devices; and
   a crash mode determining device for determining a crash mode in such a manner that the crash mode is either an offset crash or an oblique crash when the phase difference calculated by the phase difference calculating device is greater than a predetermined phase value, the crash mode is a head-on crash when the phase difference is smaller than the predetermined phase value and when the relative line integration length calculated by the relative line integration length calculating device is smaller than a predetermined length value, and the crash mode is either a pole crash or an under-ride crash when the phase difference is smaller than the predetermined phase value and when the relative line integration length is greater than the predetermined length value.

2. A crash mode determining unit according to claim 1, wherein said relative line integration length calculating device comprises:
   squaring elements for squaring one of the integrated outputs of the first and second integrating devices and the integrated output of the third integrating devices, respectively, to generate squared outputs;
   a square root calculator for calculating a square root of a sum of the respective squared outputs to generate a square root output;
   a line-integrator for line-integrating the square root output to generate a line-integration output;
   a constant multiplier for multiplying the integrated output of the third integrating device by a constant value to generate a multiplied output;
   a subtracter for subtracting the multiplied output from the line-integration output to generate a subtracted output,
   wherein the subtracted output is used as the relative line integration length.

3. A crash mode determining unit according to claim 1, wherein said crash mode determining device comprises:
   a first comparator for comparing the phase difference calculated by the phase difference calculating device with the predetermined phase value for discriminating either one of the offset crash and the oblique crash; and
   a second comparator for comparing the relative line integration length calculated by the relative line integration length calculating device with the predetermined length value for discriminating either the pole crash or the under-ride crash.

4. A crash mode determining unit of a vehicular occupant protection system comprising:
   an acceleration sensor disposed on a front side of a vehicle so as to detect acceleration generated at the front side the vehicle when the vehicle crashes;
   an integrating device for integrating the acceleration detected by the acceleration sensor to generate an integrated output;
   a line integration length calculating device for calculating a line integration length of the integrated output of the integrating device; and a crash mode determining device for determining a crash mode in such a manner that the crash mode is either a pole crash or an under-ride crash when the line integration length is greater than a predetermined length value.

5. A vehicular occupant protection system comprising:

a vehicular occupant protection unit;

first and second acceleration sensors disposed on both sides of a vehicle in a lateral direction thereof so as to detect accelerations generated at the both sides of the vehicle when the vehicle crashes;

a third acceleration sensor disposed almost at a center of the vehicle in longitudinal and lateral directions thereof to detect acceleration generated almost at the center of the vehicle when the vehicle crashes;

first to third integrating devices for respectively integrating the accelerations detected by the first to third acceleration sensors to generate integrated outputs;

a relative line integration length calculating device for calculating a relative line integration length of at least one of the integrated outputs of the first and second integrating devices with respect to the integrated output of the third integrating device;

a phase difference calculating device for calculating a phase difference between the integrated outputs of the first and second integrating devices;

a crash mode determining device for determining a crash mode in such a manner that the crash mode is either an offset crash or an oblique crash when the phase difference calculated by the phase difference calculating device is greater than a predetermined phase value, the crash mode is a head-on crash when the phase difference is smaller than the predetermined phase value and when the relative line integration length calculated by the relative line integration length calculating device is smaller than a predetermined length value, and the crash mode is either a pole crash or an under-ride crash when the phase difference is smaller than the predetermined phase value and when the relative line integration length is greater than the predetermined length value;

a crash determining device for determining whether or not a crash has occurred based on the acceleration detected by the third acceleration sensor and the crash mode determined by the crash mode determining device; and an activation unit for activating the vehicular occupant protection unit when the crash determining device determines that the crash has occurred.

6. A vehicular occupant protection system according to claim 5, wherein said relative line integration length calculating device comprises:

squaring elements for squaring one of the integrated outputs of the first and second integrating devices and the integrated output of the third integrating devices, respectively, to generate squared outputs;

a square root calculator for calculating a square root of a sum of the respective squared outputs to generate a square root output;

a line-integrator for line-integrating the square root output to generate a line-integration output;

a constant multiplier for multiplying the integrated output of the third integrating device by a constant value to generate a multiplied output;

a subtracter for subtracting the multiplied output from the line-integration output to generate a subtracted output, wherein the subtracted output is used as the relative line integration length.

7. A vehicular occupant protection system according to claim 5, wherein said crash mode determining device comprises:

a first comparator for comparing the phase difference calculated by the phase difference calculating device with the predetermined phase value for discriminating either one of the offset crash and the oblique crash; and a second comparator for comparing the relative line integration length calculated by the relative line integration length calculating device with the predetermined length value for discriminating either the pole crash or the under-ride crash.

8. A vehicular occupant protection system according to claim 5, wherein the crash determining device determines that the crash has occurred when the integrated output of the acceleration detected by the third acceleration sensor is greater than a threshold value, and the crash determining device reduces the threshold value when the crash mode determining device determines that the crash mode is either a pole crash or an under-ride crash.

9. A crash mode determining method utilized in a vehicular occupant protection system comprising the steps of:

detecting acceleration generated at a front side of a vehicle when the vehicle crashes;

integrating the acceleration detected and generating an integrated output;

calculating a line integration length of the integrated output; and determining a crash mode in such a manner that the crash mode is either a pole crash or an under-ride crash when the line integration length is greater than a predetermined length value.

10. A vehicular occupant protection system comprising:

a vehicular occupant protection unit;

a first acceleration sensor disposed on a front side of a vehicle, which detects acceleration generated at the front side of the vehicle when the vehicle crashes;

a second acceleration sensor disposed almost at a center of the vehicle in a longitudinal direction thereof, which detects acceleration generated almost at the center of the vehicle when the vehicle crashes;

a phase difference determining device for determining whether or not a phase difference between the accelerations detected by the first and second acceleration sensors is smaller than a predetermined phase difference;

a crash determining device for determining whether or not a crash has occurred based on the acceleration detected by the second acceleration sensor and generating a crash determination signal when it is determined that the crash has occurred; and an activation unit for activating the vehicular occupant protection unit when the crash determining device determines that the crash has occurred, wherein the activation unit changes activation conditions depending on presence or absence of the phase difference smaller than the predetermined phase difference.

11. A vehicular occupant protection system according to claim 10, wherein the activation unit changes the activation conditions in such a manner that when the phase difference is smaller than the predetermined phase difference, the vehicular occupant protection unit is operated more swiftly than when the phase difference is greater than the predetermined phase difference.

12. A vehicular occupant protection system according to claim 10, wherein the vehicular occupant protection unit is an air bag unit, and the activation unit changes the activation conditions in such a manner that when the phase difference is smaller than the predetermined phase difference, a relatively high pressure is used to inflate an air bag of the air bag unit and when the phase difference is greater than the predetermined phase difference, a relatively low pressure is used to inflate the air bag.

13. A vehicular occupant protection system according to claim 10, wherein the phase difference determining device comprises:

a comparator for generating a comparison output when a level of the acceleration detected by the second acceleration sensor exceeds a second acceleration sensor threshold value; and a timer for starting to count a predetermined time when a level of the acceleration detected by the first acceleration sensor exceeds a first acceleration sensor threshold value, wherein the phase difference is determined to be smaller than the predetermined phase difference when the comparator generates the comparison output before the timer finishes counting the predetermined time.

14. A vehicular occupant protection system comprising:

a vehicular occupant protection unit;

a first acceleration sensor disposed on a front side of a vehicle, which detects acceleration generated at the front side of the vehicle when the vehicle crashes;

a second acceleration sensor disposed almost at a center of the vehicle in a longitudinal direction thereof, which detects acceleration generated almost at the center of the vehicle when the vehicle crashes;

a phase difference determining device for determining whether a phase difference between the accelerations detected by the first and second acceleration sensors is smaller than a first predetermined phase difference, greater than a second predetermined phase difference which is larger than the first predetermined phase difference, or between the first and second predetermined phase differences;

a crash determining device for determining whether or not a crash has occurred based on the acceleration detected by the second acceleration sensor and generating a crash determination signal when it is determined that the crash has occurred; and an activation unit for activating the vehicular occupant protection unit when the crash determining device determines that the crash has occurred, wherein the activation unit changes activation conditions depending on a magnitude of the phase difference determined by the phase difference determining device.

15. A vehicular occupant protection system according to claim 14, wherein the activation unit changes the activation conditions in such a manner that when the phase difference is smaller than the first predetermined phase difference, the vehicular occupant protection unit is operated most swiftly, when the phase difference is between the first and second predetermined phase differences, the vehicular occupant protection unit is operated less swiftly than when the phase difference is smaller than the first predetermined phase difference, and when the phase difference is greater than the second predetermined phase difference, the vehicular occupant protection unit is operated most slowly.

16. A vehicular occupant protection system according to claim 14, wherein the vehicular occupant protection unit is an air bag unit, and the activation unit changes the activation conditions in such a manner that when the phase difference is smaller than the first predetermined phase difference, a highest pressure is used to inflate an air bag of the air bag unit, when the phase difference is between the first and second predetermined phase differences, an intermediate pressure is used to inflate the air bag, and when the phase difference is greater than the second predetermined phase difference, a lowest pressure is used to inflate the air bag.

17. A vehicular occupant protection system comprising:

first and second vehicular occupant protection units;

first and second acceleration sensors disposed both sides of a vehicle in a lateral direction thereof at its front part, which detect accelerations generated at the front side of the vehicle when the vehicle crashes;

a third acceleration sensor disposed almost at a center of the vehicle in a longitudinal direction thereof, which detects acceleration generated almost at the center of the vehicle when the vehicle crashes;

a first phase difference determining device for determining whether or not a phase difference between the accelerations detected by the first and third acceleration sensors is smaller than a predetermined phase difference;

a second phase difference determining device for determining whether or not a phase difference between the accelerations detected by the second and third acceleration sensors is smaller than the predetermined phase difference;

a crash determining device for determining whether or not a crash has occurred based on the acceleration detected by the third acceleration sensor and generating a crash determination signal when it is determined that the crash has occurred; and first and second activation units for respectively activating the first and second vehicular occupant protection units when the crash determining device determines that the crash has occurred, wherein the first and second activation units change the activation conditions depending on presence or absence of the phase differences smaller than the predetermined phase difference, which are determined by the first and second phase difference determining devices, respectively.

18. A vehicular occupant protection system according to claim 17, wherein the activation unit changes the activation conditions in such a manner that when either one of the phase differences is smaller than the predetermined phase difference, the vehicular occupant protection unit is operated more swiftly than when the phase differences are greater than the predetermined phase difference.

19. A vehicular occupant protection system according to claim 17, wherein the vehicular occupant protection unit is an air bag unit, and the activation unit changes the activation conditions in such a manner that when either one of the phase differences is smaller than the predetermined phase difference, a relatively high pressure is used to inflate an air bag of the air bag unit, and when the phase differences are greater than the predetermined phase difference, a relatively low pressure is used to inflate the air bag.

* * * * *